United States Patent
Kamiyama et al.

(10) Patent No.: US 11,325,850 B2
(45) Date of Patent: May 10, 2022

(54) NON-WASTE WATER FLUE GAS TREATMENT SYSTEM AND NON-WASTE WATER FLUE GAS TREATMENT METHOD

(71) Applicant: MITSUBISHI HITACHI POWER SYSTEMS, LTD., Yokohama (JP)

(72) Inventors: Naoyuki Kamiyama, Tokyo (JP); Nobuyuki Ukai, Tokyo (JP); Koichiro Hirayama, Tokyo (JP); Satoru Sugita, Kanagawa (JP); Tetsu Ushiku, Kanagawa (JP); Toshihiro Fukuda, Kanagawa (JP)

(73) Assignee: MITSUBISHI POWER, LTD., Tokyo (JP)

( * ) Notice: Subject to any disclaimer, the term of this patent is extended or adjusted under 35 U.S.C. 154(b) by 504 days.

(21) Appl. No.: 16/489,505

(22) PCT Filed: Mar. 27, 2018

(86) PCT No.: PCT/JP2018/012385
§ 371 (c)(1),
(2) Date: Aug. 28, 2019

(87) PCT Pub. No.: WO2018/181284
PCT Pub. Date: Oct. 4, 2018

(65) Prior Publication Data
US 2020/0071207 A1 Mar. 5, 2020

(30) Foreign Application Priority Data
Mar. 31, 2017 (JP) .............................. JP2017-071881

(51) Int. Cl.
*B01D 53/18* (2006.01)
*B01D 53/32* (2006.01)
(Continued)

(52) U.S. Cl.
CPC ................ *C02F 1/66* (2013.01); *B01D 53/18* (2013.01); *B01D 53/32* (2013.01); *B01D 53/502* (2013.01);
(Continued)

(58) Field of Classification Search
CPC ............ C02F 2101/101; C02F 2209/06; C02F 2103/18; C02F 2209/05; C02F 1/12;
(Continued)

(56) References Cited

U.S. PATENT DOCUMENTS 5,085,843 A * 2/1992 Rasmussen .......... B01D 53/501
423/243.11
6,063,348 A 5/2000 Hinke et al.
(Continued)

FOREIGN PATENT DOCUMENTS

CN 205500970 U 8/2016
JP H2-198613 A 8/1990
(Continued)

OTHER PUBLICATIONS

Office Action dated Feb. 24, 2020, issued in counterpart IN Application No. 201917034255, with English Translation. (5 pages).
(Continued)

*Primary Examiner* — Timothy C Vanoy
(74) *Attorney, Agent, or Firm* — WHDA, LLP

(57) ABSTRACT

An apparatus is disclosed including a desulfurization device which removes sulfur oxides contained in boiler flue gas, a spray drying device which sprays desulfurization waste water discharged from the desulfurization device and which dries the waste water by introducing a drying gas, a flue gas supplying line $L_{13}$ which returns, to a main flue $L_{11}$, flue gas obtained after the desulfurization waste water is evaporated and dried, an alkaline agent supplying unit which adds an alkaline agent to a desulfurization waste water line $L_{21}$, and
(Continued)

a pH meter which measures the pH in the desulfurization waste water at locations before and after the alkaline agent supplying unit in the desulfurization waste water line $L_{21}$, wherein the alkaline agent is added in accordance with a measurement result of a measured pH to cause the desulfurization waste water added with the alkaline agent to have a pH fall within a predetermined pH.

11 Claims, 13 Drawing Sheets

(51) Int. Cl.
    *B01D 53/50*    (2006.01)
    *B01D 53/78*    (2006.01)
    *C02F 1/12*    (2006.01)
    *C02F 1/66*    (2006.01)
    *C02F 103/18*    (2006.01)

(52) U.S. Cl.
CPC ................ *B01D 53/78* (2013.01); *C02F 1/12* (2013.01); *B01D 2251/404* (2013.01); *B01D 2251/606* (2013.01); *C02F 2103/18* (2013.01); *C02F 2209/05* (2013.01); *C02F 2209/06* (2013.01); *C02F 2209/29* (2013.01)

(58) Field of Classification Search
CPC ........ C02F 2209/29; C02F 1/048; C02F 1/66; B01D 53/68; B01D 2257/2064; B01D 2258/0283; B01D 53/502; B01D 2251/404; B01D 53/18; B01D 2251/604; B01D 2251/602; B01D 2257/2045; B01D 2251/304; B01D 2251/606; B01D 2257/302; B01D 53/78
See application file for complete search history.

(56) References Cited

U.S. PATENT DOCUMENTS

| | | | |
|---|---|---|---|
| 9,115,895 | B2 | 8/2015 | Okamoto et al. |
| 9,352,274 | B2 | 5/2016 | Rader et al. |
| 2013/0108535 | A1 | 5/2013 | Okamoto et al. |
| 2013/0248121 | A1* | 9/2013 | Ukai ........................ B01D 1/18 159/4.02 |
| 2015/0182910 | A1 | 7/2015 | Rader et al. |
| 2016/0214027 | A1* | 7/2016 | Fukuda .................... B01D 1/20 |
| 2016/0243493 | A1 | 8/2016 | Gansley et al. |
| 2016/0367936 | A1 | 12/2016 | Ukai et al. |

FOREIGN PATENT DOCUMENTS

| | | |
|---|---|---|
| JP | 2740533 B2 | 4/1998 |
| JP | H11-156357 A | 6/1999 |
| JP | H11-511061 A | 9/1999 |
| JP | 2001-021682 A | 1/2001 |
| JP | 2001-145818 A | 5/2001 |
| JP | 2012-196638 A | 10/2012 |
| JP | 2013-006144 A | 1/2013 |
| JP | 2013-094729 A | 5/2013 |
| JP | 2014-188511 A | 10/2014 |
| JP | 2015-128754 A | 7/2015 |
| JP | 2015-128764 A | 7/2015 |

OTHER PUBLICATIONS

International Search Report dated Jun. 26, 2018, issued in counterpart Application No. PCT/JP2018/012385. (1 page).
Written Opinion dated Jun. 26, 2018, issued in counterpart Application No. PCT/JP2018/012385, with English translation. (11 pages).
Partial Supplementary European Search Report dated Oct. 7, 2020, issued in counterpart EP Application No. 18777067.2. (13 pages).
Office Action dated Jul. 13, 2021, issued in counterpart JP Application No. 2017-071881, with English translation. (12 pages).

\* cited by examiner

NON-WASTE WATER FLUE GAS TREATMENT SYSTEM AND NON-WASTE WATER FLUE GAS TREATMENT METHOD

TECHNICAL FIELD

The present invention relates to a non-waste water flue gas treatment system and a non-waste water flue gas treatment method that treat flue gas discharged from a boiler.

BACKGROUND ART

A flue gas treatment system configured to treat flue gas discharged from a boiler installed in a thermal power generation facility or the like has been known. The flue gas treatment system includes a denitrification device configured to remove a nitrogen oxide from flue gas from a boiler, an air heater configured to recover heat of the flue gas passing through the denitrification device, a precipitator configured to remove soot in the flue gas after the heat recovery, and a desulfurization device configured to remove a sulfur oxide in the flue gas after the removal of dust. As the desulfurization device, a wet desulfurization device configured to remove a sulfur oxide in flue gas by bringing a calcium oxide absorbing liquid or the like into gas-liquid contact with the flue gas is generally used.

In recent years, with the background that the enhancement of waste water regulations has been advanced in each country, waste water needs to be treated safely and simply even in a case the waste water contains heavy metals and harmful components. As an example thereof, there is a demand for the appearance of a non-waste water treatment facility that can be stably operated.

The applicant of the present invention has proposed a technique for spray drying waste water of a wet-type desulfurization device (hereinafter, referred to as "desulfurization waste water") with waste heat of partially extracted boiler flue gas by bringing the waste water into contact with the boiler flue gas in a spray drying device that evaporates and dries the waste water (Patent Document 1).

It has been pointed out that, in such a non-waste water facility, due to the evaporation of waste water in the spray drying device, some components (such as mercury, arsenic, selenium, chlorine, boron, manganese, and nitrate ions) contained in the waste water are volatilized and collected again by a desulfurization device, thereby causing the component concentration in the system to increase. Thus, as a module for suppressing the volatilization of this volatile component, for example, a method for simultaneously adding one of activated carbon and coke and an alkaline reagent to desulfurization waste water has been proposed (Patent Document 2). Here, the activated carbon or the coke functions as an adsorbent for heavy metals (mercury and the like), and the alkaline reagent functions as a collecting agent for an acid gas (hydrogen chloride and the like).

CITATION LIST

Patent Literature

Patent Document 1: JP 2012-196638 A
Patent Document 2: US 2015/0,182,910

SUMMARY OF INVENTION

Technical Problem

However, since heavy metals are removed in form of being contained in ashes of a precipitator and calcium sulfate of the desulfurization device, the heavy metals may be sufficiently removed even without the activated carbon or the coke depending on a mass balance. Both of the activated carbon/the coke and the alkali may not always need to be added. In addition, in Patent Document 2, the amount of addition of alkali is not controlled. Thus, when fluctuations in load of the boiler and changes in fuel or coal type change the amount of waste water and waste water composition, a great amount of alkali tends to be added because removal performance of an acid gas is deficient in a case of a small amount of alkali. In a case of a great amount of alkali, the removal performance becomes excessive, which may lead to an increase in cost of alkali.

In view of the problems described above, an object of the present invention is to provide a non-waste water flue gas treatment system and a non-waste water flue gas treatment method capable of preventing excess and deficiency of removal performance of an acid gas by optimizing the amount of addition of an alkaline agent.

Solution to Problem

A non-waste water flue gas treatment system according to one embodiment of the present invention to solve the above-described problem includes: a boiler configured to combust fuel; a heat recovering device provided in a main flue that discharges a boiler flue gas from the boiler and configured to recover heat of the boiler flue gas; a desulfurization device configured to remove a sulfur oxide contained in the boiler flue gas with a desulfurization absorbing liquid; a spray drying device configured to spray waste water including desulfurization waste water discharged from the desulfurization device; a flue gas introduction line configured to introduce a drying gas for evaporating and drying the desulfurization waste water into the spray drying device; a flue gas supplying line configured to return a flue gas obtained after the desulfurization waste water is evaporated and dried in the spray drying device back to the main flue; an alkali supplying unit configured to add an alkaline agent to a desulfurization waste water line that connects the desulfurization device and the spray drying device; and a pH meter configured to measure a pH in the desulfurization waste water in the desulfurization waste water line before and after the alkali supplying unit. The alkali supplying unit adds the alkaline agent in accordance with a measurement result of a measured pH to cause a pH value of desulfurization waste water after addition of the alkaline agent to fall within a predetermined pH.

According to the above-described invention, by measuring a pH in the desulfurization waste water introduced into the spray drying device and adding the alkaline agent to satisfy a predetermined pH (for example, pH 6 to 10), the amount of addition of alkali can be optimized, and excess and deficiency of removal performance of an acid gas can be prevented.

In some embodiments, the above-described non-waste water flue gas treatment system further includes: a solid-liquid separator provided in the desulfurization waste water line that discharges the desulfurization waste water and configured to separate a solid; and a separated water introduction line configured to supply separated water from the solid-liquid separator to the spray drying device. The alkali supplying unit is provided in the separated water introduction line between the solid-liquid separator and the spray drying device. The pH meter is provided in the separated water introduction line at least upstream or downstream of the alkali supplying unit. The alkali supplying unit adds the alkaline agent in accordance with a measurement result of a measured pH to cause a pH value of separated water after addition of the alkaline agent to be a predetermined pH.

According to the above-described invention, by measuring a pH in the waste water introduced into the spray drying device and adding the alkaline agent to satisfy a predetermined pH (for example, pH 6 to 10), the amount of addition of alkali can be optimized, and excess and deficiency of removal performance of an acid gas can be prevented.

A non-waste water flue gas treatment system according to one embodiment of the present invention to solve the above-described problem includes: a boiler configured to combust fuel; a heat recovering device provided in a main flue that discharges a boiler flue gas from the boiler and configured to recover heat of the boiler flue gas; a desulfurization device configured to remove a sulfur oxide contained in the boiler flue gas with a desulfurization absorbing liquid; a spray drying device configured to spray waste water including desulfurization waste water discharged from the desulfurization device; a flue gas introduction line configured to introduce a drying gas for evaporating and drying the waste water into the spray drying device; a flue gas supplying line configured to return a flue gas after the waste water being evaporated and dried in the spray drying device back to the main flue; an alkali supplying unit configured to add an alkaline agent to a desulfurization waste water line that connects the desulfurization device and the spray drying device, or to the flue gas supplying line; and a chlorine ion measurement device provided in any one of or a plurality of the main flue, the flue gas supplying line and the desulfurization waste water line and configured to measure a concentration of a chlorine ion. The alkali supplying unit adds the alkaline agent to the desulfurization waste water or the flue gas in accordance with a result of a measured chlorine ion concentration to cause a molar ratio of alkaline agent and chlorine (Cl) ion to fall within a predetermined range.

According to the above-described present invention, by measuring a chlorine ion concentration contained in any one of or a plurality of fluids of the main flue, the flue gas supplying line, and the desulfurization waste water line with the chlorine ion measurement device, and adding the alkaline agent in accordance with the measured chlorine ion concentration to satisfy the molar ratio of alkaline agent and chlorine (Cl) ion, the amount of addition of alkali can be optimized, and excess and deficiency of removal performance of an acid gas can be prevented.

In some embodiments, the above-described non-waste water flue gas treatment system further includes: a solid-liquid separator provided in the desulfurization waste water line that discharges the desulfurization waste water and configured to separate a solid; and a separated water introduction line configured to supply separated water from the solid-liquid separator to the spray drying device. The chlorine ion measurement device and the alkali supplying unit are provided in the separated water introduction line between the solid-liquid separator and the spray drying device. The alkali supplying unit adds the alkaline agent to the separated water in accordance with a result of a measured chlorine ion concentration to cause a molar ratio of alkaline agent and chlorine (Cl) ion to fall within a predetermined range.

According to the above-described present invention, by measuring a chlorine ion concentration in the separated water in the separated water introduction line with the chlorine ion measurement device, and adding the alkaline agent to the separated water in accordance with the measured chlorine ion concentration to satisfy the molar ratio of alkaline agent and chlorine (Cl) ion, the amount of addition of alkali can be optimized, and excess and deficiency of removal performance of an acid gas can be prevented.

A non-waste water flue gas treatment system according to one embodiment of the present invention to solve the above-described problem includes: a boiler configured to combust fuel; a heat recovering device provided in a main flue that discharges a boiler flue gas from the boiler and configured to recover heat of the boiler flue gas; a desulfurization device configured to remove a sulfur oxide contained in the boiler flue gas with a desulfurization absorbing liquid; a spray drying device configured to spray waste water including desulfurization waste water from the desulfurization device; a flue gas introduction line configured to introduce a drying gas for evaporating and drying the desulfurization waste water into the spray drying device; a flue gas supplying line configured to return a flue gas obtained after the desulfurization waste water being evaporated and dried in the spray drying device back to the main flue; an alkali supplying unit configured to add an alkaline agent to a desulfurization waste water line that connects the desulfurization device and the spray drying device, or to the flue gas supplying line; and an electrical conductivity meter provided in any one of or both of the desulfurization device and the desulfurization waste water line and configured to measure electrical conductivity in liquid. The alkali supplying unit adds the alkaline agent to the desulfurization waste water or the flue gas in accordance with a result obtained by obtaining a chlorine ion concentration in liquid from a relationship between previously obtained electrical conductivity and a chlorine ion to cause a molar ratio of alkaline agent and chlorine (Cl) ion to fall within a predetermined range.

According to the above-described present invention, by measuring electrical conductivity of liquid of the desulfurization device and the desulfurization waste water line, obtaining a chlorine ion concentration indirectly from the electrical conductivity, and adding the alkaline agent in accordance with the obtained chlorine ion concentration to satisfy the molar ratio of alkaline agent and chlorine (Cl) ion, the amount of addition of alkali can be optimized, and excess and deficiency of removal performance of an acid gas can be prevented.

In some embodiments, the above-described non-waste water flue gas treatment system further includes: a solid-liquid separator provided in the desulfurization waste water line that discharges the desulfurization waste water and configured to separate a solid; and a separated water introduction line configured to supply separated water from the solid-liquid separator to the spray drying device. The electrical conductivity meter and the alkali supplying unit are provided in the separated water introduction line. The alkali supplying unit adds the alkaline agent to separated water in accordance with a result obtained by obtaining a chlorine ion concentration in the separated water from a relationship between previously obtained electrical conductivity and a chlorine ion to cause a molar ratio of alkaline agent and chlorine (Cl) ion to fall within a predetermined range.

According to the above-described present invention, by measuring electrical conductivity of the separated water, obtaining a chlorine ion concentration indirectly from the electrical conductivity, and adding the alkaline agent in accordance with the obtained chlorine ion concentration to satisfy the molar ratio of alkaline agent and chlorine (Cl) ion, the amount of addition of alkali can be optimized, and excess and deficiency of removal performance of an acid gas can be prevented.

In some embodiments, in the above-described non-waste water flue gas treatment system, the alkaline agent added to the flue gas supplying line is liquid or powder.

According to the above-described invention, any of the liquid and powder alkaline agents can be added to the flue gas in the flue gas supplying line, and an acid gas can be removed.

In some embodiments, in the above-described non-waste water flue gas treatment system, a solid removal device configured to remove a solid in flue gas is provided in the flue gas supplying line.

According to the above-described invention, by removing a solid in the flue gas while removing an acid gas with an optimal amount of alkali, the solid can be prevented from mixing with ashes of a precipitator in the main flue.

A non-waste water flue gas treatment method according to one embodiment of the present invention to solve the above-described problem includes: a desulfurization step of removing a sulfur oxide contained in a boiler flue gas with a desulfurization absorbing liquid; a spray drying step of spraying waste water including desulfurization waste water discharged in the desulfurization step, and drying the waste water with a part of the boiler flue gas; a pH measurement step of measuring a pH in the desulfurization waste water; and an alkali supplying step of adding an alkaline agent to the desulfurization waste water. In the alkali supplying step, the alkaline agent is added in accordance with a measurement result of a measured pH to cause a pH value of desulfurization waste water after addition of the alkaline agent to fall within a predetermined pH.

According to the above-described invention, by measuring a pH in the desulfurization waste water introduced into the spray drying device and adding the alkaline agent to satisfy a predetermined pH (for example, pH 6 to 10), the amount of addition of alkali can be optimized, and excess and deficiency of removal performance of an acid gas can be prevented.

A non-waste water flue gas treatment method according to one embodiment of the present invention to solve the above-described problem includes: a desulfurization step of removing a sulfur oxide contained in a boiler flue gas with a desulfurization absorbing liquid; a spray drying step of spraying waste water including desulfurization waste water discharged in the desulfurization step, and drying the waste water with a part of the boiler flue gas; an alkali supplying step of adding an alkaline agent to the desulfurization waste water or a flue gas from the spray drying step; and a chlorine ion measurement step of measuring a concentration of a chlorine ion contained in any one of or a plurality of fluids of the boiler flue gas, a flue gas after the spray drying step, and the desulfurization waste water. In the alkali supplying step, the alkaline agent is added to the desulfurization waste water or the flue gas in accordance with a result of a measured chlorine ion concentration to cause a molar ratio of alkaline agent and chlorine (Cl) ion to fall within a predetermined range.

According to the above-described present invention, by measuring a chlorine ion concentration contained in any one of or a plurality of fluids of the main flue, the flue gas supplying line, and the desulfurization waste water line with the chlorine ion measurement device, and adding the alkaline agent in accordance with the measured chlorine ion concentration to satisfy the molar ratio of alkaline agent and chlorine (Cl) ion, the amount of addition of alkali can be optimized, and excess and deficiency of removal performance of an acid gas can be prevented.

A non-waste water flue gas treatment method according to one embodiment of the present invention to solve the above-described problem includes: a desulfurization step of removing a sulfur oxide contained in a boiler flue gas with a desulfurization absorbing liquid; a spray drying step of spraying waste water including desulfurization waste water discharged in the desulfurization step, and drying the waste water with a part of the boiler flue gas; an alkali supplying step of adding an alkaline agent to the desulfurization waste water or a flue gas from the spray drying step; and an electrical conductivity measurement step of measuring electrical conductivity in liquid of any one of or both of the desulfurization absorbing liquid and the desulfurization waste water. In the alkali supplying step, the alkaline agent is added to the desulfurization waste water or the flue gas in accordance with a result obtained by obtaining a chlorine ion concentration in liquid from a relationship between previously obtained electrical conductivity and a chlorine ion to cause a molar ratio of alkaline agent and chlorine (Cl) ion to fall within a predetermined range.

According to the above-described present invention, by measuring electrical conductivity of liquid of the desulfurization device and the desulfurization waste water line, obtaining a chlorine ion concentration indirectly from the electrical conductivity, and adding the alkaline agent in accordance with the obtained chlorine ion concentration to satisfy the molar ratio of alkaline agent and chlorine (Cl) ion, the amount of addition of alkali can be optimized, and excess and deficiency of removal performance of an acid gas can be prevented.

Advantageous Effect of Invention

According to the present invention, by measuring a pH in separated water introduced into a spray drying device and adding an alkaline agent to satisfy a predetermined pH (for example, pH 6 to 10), the amount of addition of alkali can be optimized, and excess and deficiency of removal performance of an acid gas can be prevented.

Further, by measuring a chlorine ion concentration contained in flue gas or desulfurization waste water in a main flue with a chlorine ion measurement device, and adding an alkaline agent in accordance with the measured chlorine ion concentration to cause a molar ratio of alkaline agent and chlorine (Cl) ion to fall within a predetermined range, the amount of addition of alkali can be optimized, and excess and deficiency of removal performance of an acid gas can be prevented.

DESCRIPTION OF EMBODIMENTS

Now, with reference to the accompanying drawings, embodiments of the present invention are described in detail. Note that, the present invention is not limited to those embodiments, and when a plurality of embodiments are given, the present invention is intended to include a configuration obtained by combining those embodiments.

EXAMPLE 1

Figure 1A:
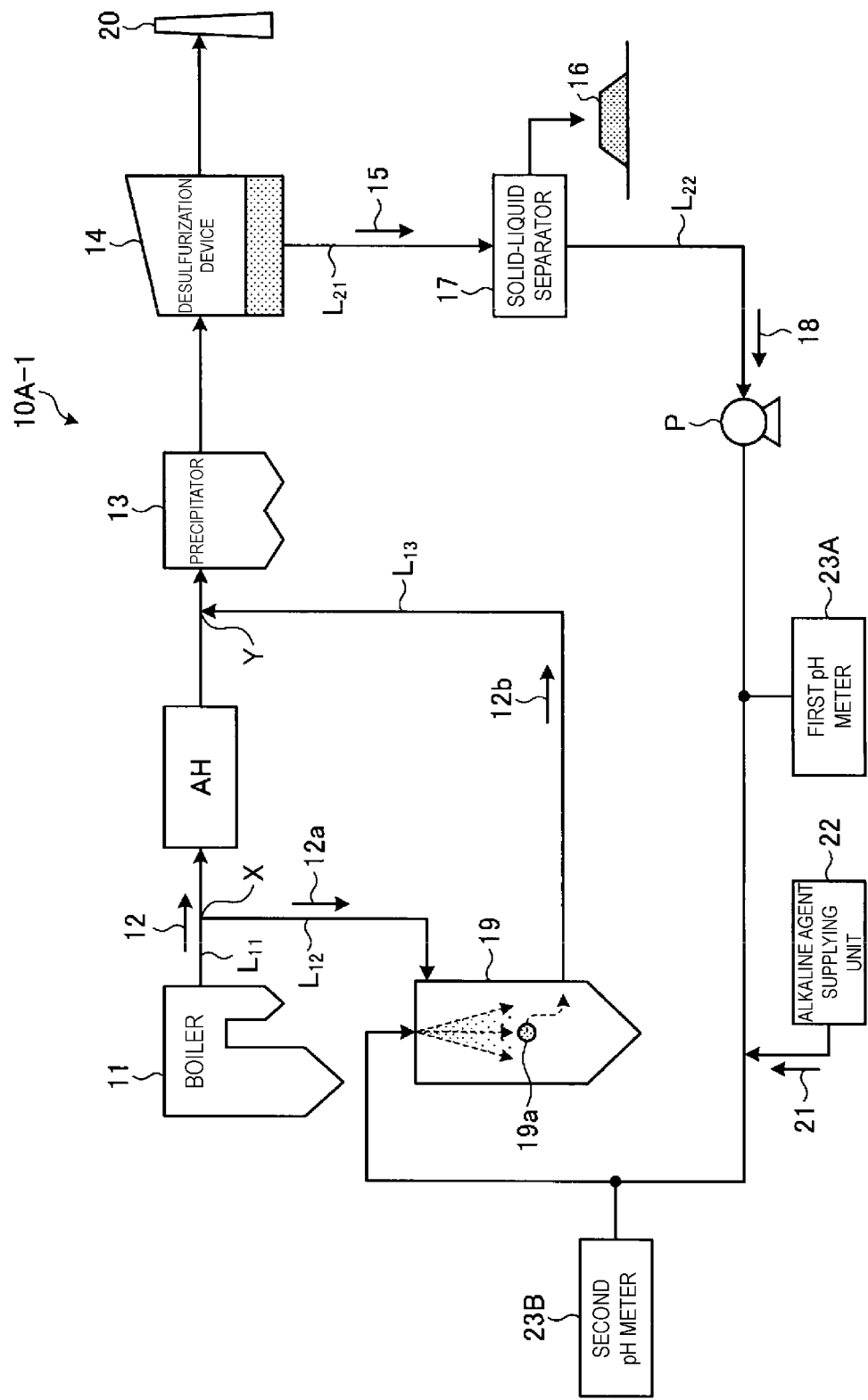
FIG. 1A is a schematic view of a non-waste water flue gas treatment system of Example 1.
Figure 1B:
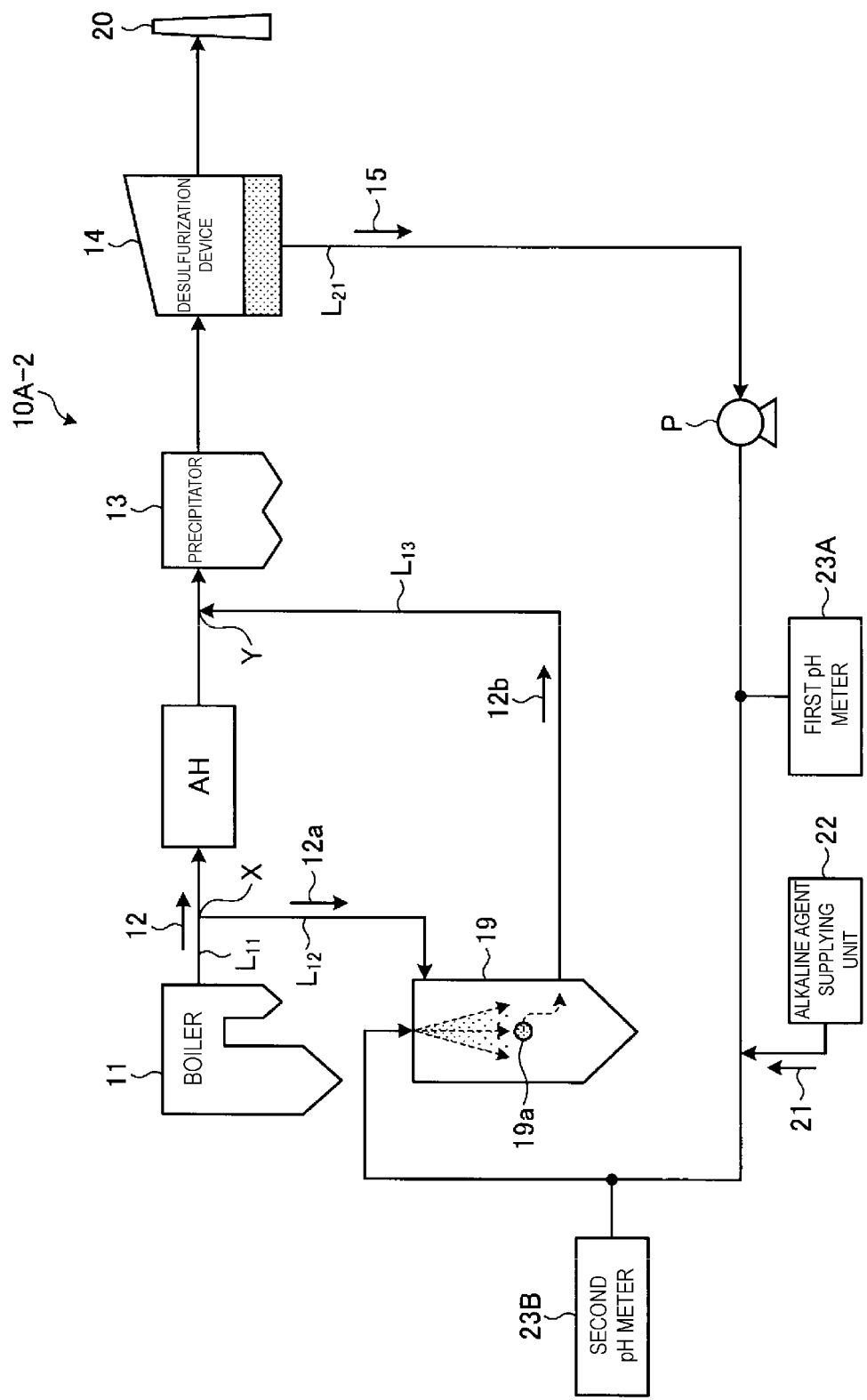
FIG. 1B is a schematic view of another non-waste water flue gas treatment system of Example 1.

FIG. 1A is a schematic view of a non-waste water flue gas treatment system of Example 1. FIG. 1B is a schematic view of another non-waste water flue gas treatment system of Example 1. As illustrated in FIG. 1A-1, a waste water-less flue gas treatment system 10A-1 according to the present embodiment includes a boiler 11 configured to combust supplied fuel; an air heater AH being a heat recovering device provided in a main flue $L_{11}$ that discharges a boiler flue gas (also referred to as an "flue gas") 12 from the boiler 11 and configured to recover heat of the boiler flue gas 12; an electrostatic precipitator (also referred to as a "precipitator") 13 being a dust removal device configured to remove soot in the boiler flue gas 12 after the heat recovery; a desulfurization device 14 configured to remove a sulfur oxide contained in the boiler flue gas 12 after the dust removal; a solid-liquid separator 17 configured to remove a solid 16 from desulfurization waste water (absorbing liquid slurry in a case of an absorbing liquid method) 15 discharged from the desulfurization device 14 via a desulfurization waste water line $L_{21}$; a spray drying device 19 configured to spray waste water including separated water 18 from the solid-liquid separator 17; a flue gas introduction line $L_{12}$ that introduces a part of a drying gas 12a from the boiler flue gas 12 into the spray drying device 19 from the main flue $L_{11}$; a flue gas supplying line $L_{13}$ that returns a flue gas 12b obtained after the separated water 18 is evaporated and dried in the spray drying device 19 back to the main flue $L_{11}$; an alkaline agent supplying unit 22 configured to add an alkaline agent 21 to a separated water introduction line $L_{22}$ that connects the solid-liquid separator 17 to the spray drying device 19; and pH meters configured to measure a pH in the separated water 18 in the separated water introduction line $L_{22}$ before and after the alkaline agent supplying unit 22. The alkaline agent supplying unit 22 adds the alkaline agent in accordance with a measurement result of a measured pH to cause a pH value of the separated water 18 after addition of the alkaline agent 21 to fall within a predetermined pH (for example, pH 6 to 10).

According to this system, the boiler flue gas 12 is purified by the desulfurization device 14, and the solid (calcium sulfate) 16 and the separated water 18 are also solid-liquid separated from the desulfurization waste water 15, and the separated water 18 being separated is evaporated and dried by using the introduced drying gas 12a in the spray drying device 19. Thus, non-waste water of the desulfurization waste water 15 from the desulfurization device 14 can be stably achieved.

Here, the air heater AH of the non-waste water flue gas treatment system 10A-1 is a heat exchanger that recovers heat in the boiler flue gas 12 supplied from the boiler 11 via the main flue $L_{11}$. Since a temperature of the boiler flue gas 12 being exhausted is a high temperature at, for example, approximately 300 to 400° C., heat exchange is performed between the high-temperature boiler flue gas 12 and combustion air at a normal temperature by this air heater AH, and the combustion air having a temperature increased by the heat exchange is supplied to the boiler 11.

When the boiler flue gas 12 flowing into this air heater AH is branched as the drying gas 12a from the main flue $L_{11}$ via the flue gas introduction line $L_{12}$, a gas temperature is high (for example, 300 to 400° C.), and thus spray drying of desulfurization waste water droplets can be efficiently performed by bringing this high-temperature waste heat into contact with the separated water 18. In the present embodiment, the air heater AH is installed between a branch portion X of the flue gas introduction line $L_{12}$ that branches the drying gas 12a and a merging portion Y that returns the flue gas 12b back to the main flue $L_{11}$ side by the flue gas supplying line $L_{13}$.

The precipitator 13 removes soot in the boiler flue gas 12 from the boiler 11. Examples of the precipitator 13 include an inertial precipitator, a centrifugal precipitator, a filtration precipitator, a cleaning precipitator, and the like in addition to an electrostatic precipitator, which is not particularly limited thereto.

The desulfurization device 14 is a device for wet removal of a sulfur oxide in the boiler flue gas 12 after soot are removed by the precipitator 13. In this desulfurization device 14, a desulfurization method of a lime-gypsum method using, for example, calcium oxide slurry as a desulfurization absorbing liquid (hereinafter, also referred to as an "absorbing liquid") can be used as a wet desulfurization method, for example. However, this is not restrictive. In addition to the desulfurization method of the lime-gypsum method, wet-type desulfurization devices of a magnesium hydroxide method, a seawater method, a caustic soda method, and the like can be exemplified, for example.

Figure 2:
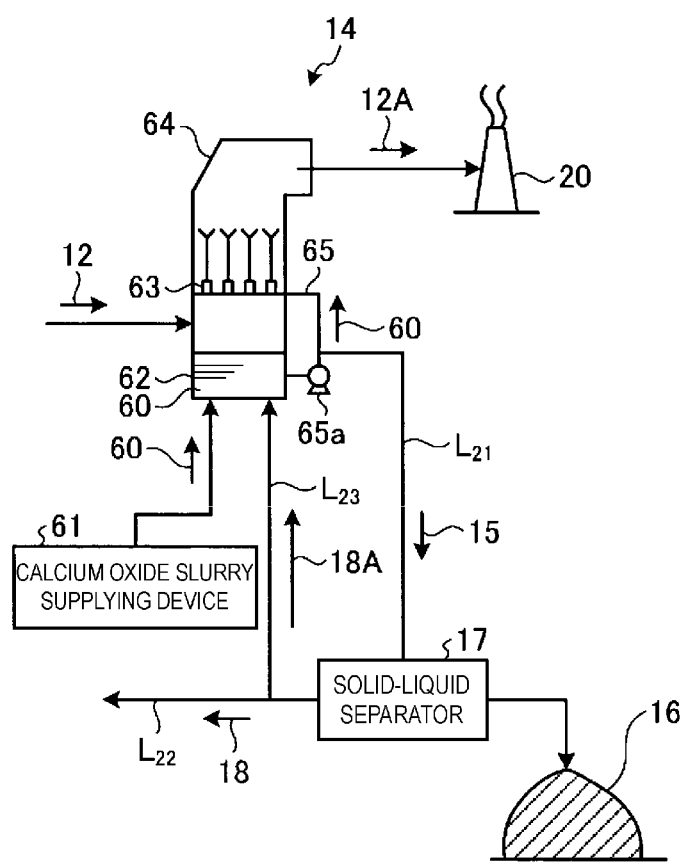
FIG. 2 is a schematic view illustrating one example of a desulfurization device of a lime-gypsum method.

One example of this wet desulfurization device will be described by using FIG. 2. FIG. 2 is a schematic view illustrating one example of a desulfurization device of a lime-gypsum method. As illustrated in FIG. 2, the wet desulfurization device 14 uses, for example, calcium oxide slurry (aqueous solution in which calcium oxide powder is dissolved in water) as an absorbing liquid 60, and a temperature inside the device is around 50° C. The calcium oxide slurry is supplied from a calcium oxide slurry supplying device (calcium oxide supplying device for desulfurization device) 61 to a reservoir in a column bottom portion 62 of the desulfurization device 14. The calcium oxide slurry supplied to the column bottom portion 62 of the desulfurization device 14 is fed to a plurality of nozzles 63 in the desulfurization device 14 via an absorbing liquid circulation line 65, and is jetted upward as a liquid column from the nozzles 63 toward a column top portion 64 side. The absorbing liquid circulation line 65 is provided with a liquid feed pump 65a, and the calcium oxide slurry is fed from the absorbing liquid circulation line 65 to the nozzles 63 by driving the liquid feed pump 65a. When the boiler flue gas 12 rising from the column bottom portion 62 side of the desulfurization device 14 comes into gas-liquid contact with the calcium oxide slurry jetted from the nozzles 63, the sulfur oxide and mercury chloride in the boiler flue gas 12 are absorbed by the calcium oxide slurry and separated and removed from the boiler flue gas 12. The boiler flue gas 12 purified by the calcium oxide slurry is discharged as a purified gas 12A from the column top portion 64 side of the desulfurization device 14, and is released from a stack 40 to the outside.

A reaction represented by Equation (1) below between a sulfurous acid gas $SO_2$ in the boiler flue gas 12 and the calcium oxide slurry occurs inside the desulfurization device 14.

$$SO_2 + CaCO_3 \rightarrow CaSO_3 + CO_2 \quad (1)$$

Furthermore, the calcium oxide slurry that has absorbed $SO_x$ in the boiler flue gas 12 is oxidized by air (not illustrated) supplied to the column bottom portion 62 of the desulfurization device 14, and a reaction with the air represented by Equation (2) below occurs.

$$CaSO_3 + 1/2 O_2 + 2H_2O \rightarrow CaSO_4 \cdot 2H_2O \quad (2)$$

In this way, $SO_x$ in the boiler flue gas 12 is collected in the form of calcium sulfate ($CaSO_4 \cdot 2H_2O$) in the desulfurization device 14.

Further, as described above, the calcium oxide slurry obtained by pumping a liquid stored in the column bottom portion 62 of the desulfurization device 14 is used. However, as the desulfurization device 14 operates, the pumped calcium oxide slurry is mixed with calcium sulfate $CaSO_4 \cdot 2H_2O$ as the reaction Equations (1) and (2). Hereinafter, calcium oxide-calcium sulfate slurry (calcium oxide slurry mixed with calcium sulfate) for absorbing the sulfurous acid gas is referred to as an absorbing liquid.

The absorbing liquid (calcium oxide slurry) 60 used for desulfurization in the desulfurization device 14 is circulated and recycled by the absorbing liquid circulation line 65 of the desulfurization device 14, and a part of the absorbing liquid 60 is discharged to the outside as the desulfurization waste water 15 via the desulfurization waste water line $L_{21}$ connected to this absorbing liquid circulation line 65, and is separately fed to the solid-liquid separator 17 where dehydration treatment is performed. The separated water 18 being solid-liquid separated contains harmful heavy metals such as mercury, arsenic, and selenium, for example, and halogen ions such as $Cl^-$, $Br^-$, $I^-$, and $F^-$, for example.

The solid-liquid separator 17 separates the solid (calcium sulfate) 16 in the desulfurization waste water 15 and the separated water (filtrate) 18 of a liquid portion. For example, a belt filter, a centrifugal separator, a decanter type centrifugal sedimentator, or the like is used as the solid-liquid separator 17. Thus, the desulfurization waste water 15 discharged from the desulfurization device 14 is separated into the solid (calcium sulfate) 16 and the separated water 18 being dehydrated filtrate by the solid-liquid separator 17. The separated solid (calcium sulfate) 16 is discharged to the outside of the system (hereinafter referred to as "out of the system").

On the other hand, as illustrated in FIG. 1, the separated water 18 from the solid-liquid separator 17 is fed to the spray drying device 19 via the separated water introduction line $L_{22}$ and is then evaporated and dried herein, and non-waste water of the separated water 18 being desulfurization waste water is achieved. Note that a part of the separated water 18 is supplied as return water 18A to the column bottom portion 62 of the desulfurization device 14 via a return water line $L_{23}$.

The spray drying device 19 includes a gas introduction module into which the drying gas 12a from the boiler flue gas 12 is introduced via the flue gas introduction line $L_{12}$ branching from the main flue $L_{11}$ of the boiler flue gas 12 from the boiler 11, and a spraying module 52 configured to spread or spray the separated water 18 introduced from the solid-liquid separator 17 via the separated water introduction line $L_{22}$. Then, the separated water 18 spread or sprayed by waste heat of the drying gas 12a to be introduced is evaporated and dried. Here, the drying gas 12a from the boiler flue gas 12 contains combustion ashes contained in the boiler flue gas 12, and the combustion ashes and evaporation salt are mixed in an evaporated dried body generated by the spray drying device 19. Note that the reference sign $L_{13}$ denotes a flue gas supplying line that returns the flue gas 12b from the spray drying device 19 back to the main flue $L_{11}$. Note that the flue gas introduction line $L_{12}$ and the flue gas supplying line $L_{13}$ may be provided with a damper module for stopping flow in and discharge of the drying gas 12a and the flue gas 12b.

Note that a denitrification device, which is not provided in the non-waste water flue gas treatment system 10A-1 in the present embodiment, that removes a nitrogen oxide in the boiler flue gas 12 may be separately provided in the main flue $L_{11}$. Note that when a denitrification device is provided, the denitrification device is preferably installed downstream of the boiler 11 and upstream of the branch portion X that branches the drying gas 12a from the main flue $L_{11}$.

Further, a heat recovering unit is installed between the branch portion X of the flue gas introduction line $L_{12}$ and the merging portion Y in which the flue gas 12b is returned back to the main flue $L_{11}$ side by the flue gas supplying line $L_{13}$, and a reheating unit is installed between the desulfurization device 14 and the stack 20, thereby constituting a gas gas heater (GGH). Heat of the boiler flue gas 12 is recovered by a heat medium in the heat recovering unit at an outlet of the air heater AH, and a released gas from the desulfurization device is heated by the heat medium recovered heat from the flue gas in the reheating unit to a preferred temperature (about 90° C. to 100° C.) for being released to the atmosphere, and then released to the atmosphere from the stack 20.

Further, when the solid in the desulfurization waste water 15 from the desulfurization device 14 is not separated, installation of the solid-liquid separator 17 is unnecessary as in a non-waste water flue gas treatment system 10A-2 illustrated in FIG. 1B. The alkaline agent 21 added to the separated water 18 in FIG. 1A is added directly to the desulfurization waste water 15, and then sprayed and dried in the spray drying device 19, which achieves non-waste water. Although the present invention is unconcerned about the presence or absence of the solid-liquid separator 17, the following description will be given of an aspect including the solid-liquid separator 17. Note that in a case without the solid-liquid separator 17, the separated water 18 is replaced with the desulfurization waste water 15.

Figure 3:
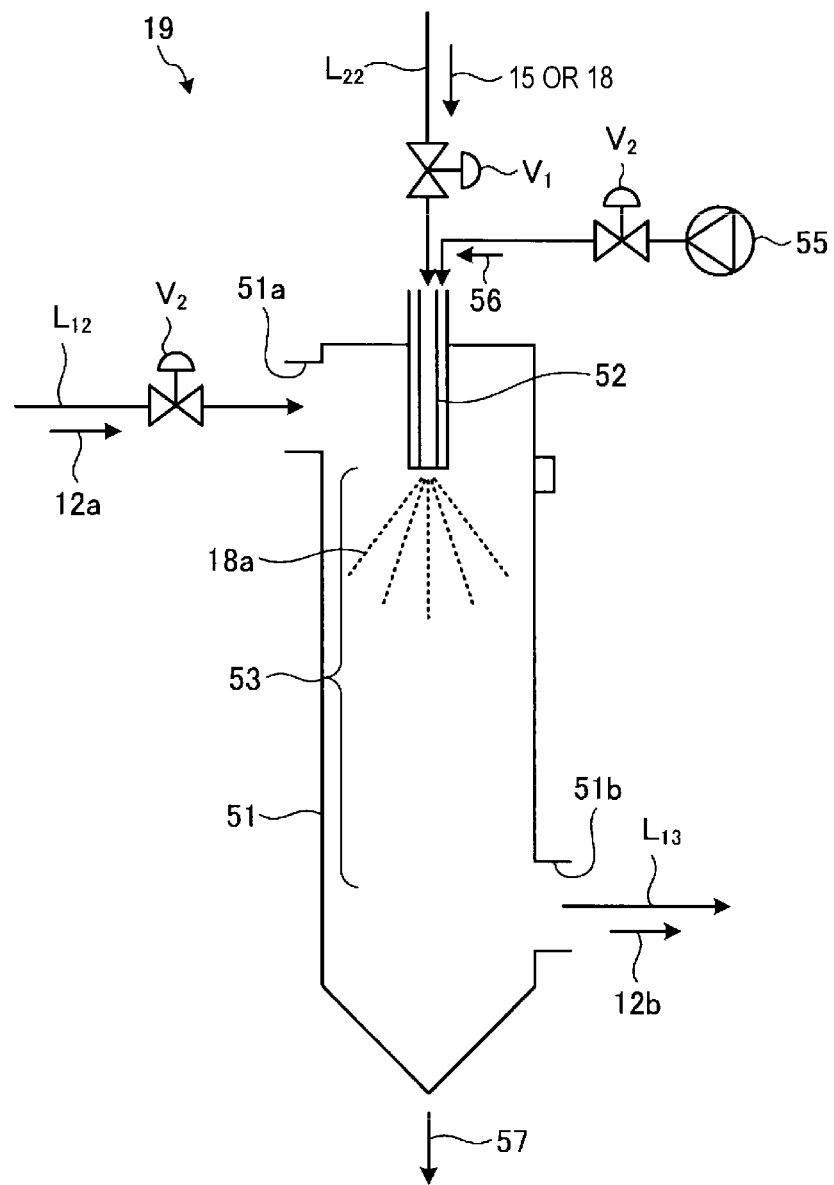
FIG. 3 is a schematic view illustrating one example of a spray drying device for desulfurization waste water of Example 1.

FIG. 3 is a schematic view illustrating one example of a spray drying device for desulfurization waste water of Example 1. As illustrated in FIG. 3, the spray drying device 19 in the present embodiment includes, in a spray drying device main body 51, the spraying module 52 for spraying the desulfurization waste water 15 or the separated water 18 as a spray liquid 18a, an introduction inlet 51a provided in the spray drying main body 51 for introducing the drying gas 12a that dries the spray liquid 18a, a drying region 53 provided in the spray drying device main body 51 for drying and evaporating the spray liquid 18a with the drying gas 12a, and a discharge port 51b for discharging the flue gas 12b that contributes to drying. Note that a reference sign 57 denotes a separated solid, and $V_1$ and $V_2$ denote flow rate adjustment valves. Further, the desulfurization waste water 15 or the separated water 18 may be sprayed by the spraying module 52 at a predetermined flow rate and in a predetermined spray droplet particle size into the spray drying device main body 51 with an air 56 separately supplied from a compressor 55. In the present embodiment, the drying gas 12a that branches from the boiler flue gas 12 is used as the drying gas for the spray liquid 18a. However, the present invention is not limited thereto, and a gas other than the boiler flue gas may be used as the drying gas as long as the gas is a drying gas for evaporating and drying the spray liquid 18a.

Here, a form of the spraying module 52 is not limited as long as the spraying module 52 sprays the spray liquid 18a to cause the spray liquid 18a has a predetermined droplet size. For example, a spraying module such as a two fluid nozzle and a rotary atomizer can be used. Note that the two fluid nozzle is suitable for spraying a relatively small amount of the separated water 18, and the rotary atomizer is suitable for spraying a relatively large amount of the desulfurization waste water 15 or the separated water 18. Further, the number of sprayers is not limited to one, and a plurality of sprayers may be provided in accordance with the amount of treatment.

In the present embodiment, the alkaline agent supplying unit 22 configured to add the alkaline agent 21 to the separated water introduction line $L_{22}$ between the solid-liquid separator 17 and the spray drying device 19, and the pH meters that measure a pH in the separated water 18 in the separated water introduction line $L_{22}$ before and after the alkaline agent supplying unit 22 are provided. The alkaline agent is added in accordance with a measurement result of a measured pH to cause a pH value of the separated water 18 after addition of the alkaline agent 21 to fall within a predetermined pH (for example, pH 6 to 10).

Here, the alkaline agent supplying unit 22 includes a chemical storage unit configured to store the alkaline agent 21 serving as a chemical, a chemical line that connects the storage unit and the desulfurization waste water line $L_{21}$, and a supply unit, such as a pump, for example, configured to supply the alkaline agent 21 from the chemical storage unit to the desulfurization waste water line $L_{21}$.

Note that, in the non-waste water flue gas treatment system 10A, in a case without the solid-liquid separator 17, the alkaline agent supplying unit 22 configured to add the alkaline agent 21 to the desulfurization waste water line $L_{21}$, and the pH meters that measure a pH in the desulfurization waste water 15 before and after the alkaline agent supplying unit 22 are provided. The alkaline agent is added in accordance with a measurement result of a measured pH to cause a pH value of the desulfurization waste water 15 after addition of the alkaline agent 21 to fall within a predetermined pH (for example, pH 6 to 10).

According to the present embodiment, by measuring a pH in the desulfurization waste water 15 or the separated water 18 introduced into the spray drying device 19 and adding the alkaline agent 21 to satisfy a predetermined pH (pH 6 to 10), the amount of addition of alkali can be optimized, and excess and deficiency of removal performance of an acid gas can be prevented.

A mechanism in which components resulting from an acid gas accumulate in the system is described by taking hydrogen chloride, which is a main acid gas, as an example. Hydrogen chloride is an acid gas contained in the boiler flue gas 12, and is collected by the calcium sulfate slurry in the desulfurization device 14 and becomes calcium chloride. An aqueous solution containing calcium chloride is known to generate hydrogen chloride by an equilibrium reaction according to the following equation (3) in the process of evaporation. When calcium chloride in the separated water 18 remains as calcium chloride in the flue gas supplying line $L_{13}$ downstream of the spray drying device 19, the flue gas 12b returns back to the main flue $L_{11}$ and is collected by the precipitator 13, which causes no problem. However, when hydrogen chloride is produced as the following equation (3), the hydrogen chloride is collected again by the desulfurization device 14, and thus chlorine ions are accumulated in the system.

$$CaCl_2 + H_2O \Leftrightarrow Ca(OH)Cl + HCl \tag{3}$$

By adding the alkaline agent 21 to the desulfurization waste water 15 or the separated water 18, volatilization of an acid gas can be prevented by a neutralization reaction. Equation (4) below is an example of a neutralization reaction when sodium hydroxide is used as an alkaline agent. Here, a sufficient neutralization reaction occurs by adding an alkali to cause a pH value of the desulfurization waste water 15 or the separated water 18 after the addition of the alkaline agent 21 to be pH 6 to 10, and volatilization of the acid gas is suppressed.

$$HCl + NaOH \rightarrow H_2O + NaCl \tag{4}$$

Thus, by measuring a pH of the desulfurization waste water 15 or the separated water 18 with a first pH meter 23A and adding the alkaline agent to satisfy a predetermined pH (pH 6 to 10), sufficient removal performance of an acid gas can be obtained, and excess of the removal performance can be prevented. The amount of addition of the alkaline agent 21 can be optimized while removing the acid gas.

In this way, the problem of preventing excess and deficiency of the acid gas removal performance in the prior art (Patent Document 2) is overcome. Further, by setting a place where a pH value is controlled to be the desulfurization waste water 15 or the separated water 18 after the addition of the alkaline agent 21, there are advantages that it is possible to accommodate fluctuations in pH values of desulfurization waste water due to fluctuations in the boiler load and changes in the boiler fuel, and to stably prevent excess and deficiency of the amount of alkali.

Note that, in the present embodiment, a pH value of the desulfurization waste water 15 or the separated water 18 after the addition of the alkaline agent 21 may be measured by installing a second pH meter 23B in the separated water introduction line $L_{22}$ between the alkaline agent supplying unit 22 and the spray drying device 19, or may be calculated from a pH measurement value of the first pH meter 23A and the amount of addition.

In other words, when the second pH meter 23B is installed downstream of the alkaline agent supplying unit 22 of the separated water introduction line $L_{22}$, a pH of the desulfurization waste water 15 or the separated water 18 after the addition of the alkaline agent can be measured directly. Thus, the addition of the alkaline agent can be adjusted to set a pH to be a predetermined pH. Further, when the first pH meter 23A is installed upstream of the alkaline agent supplying unit 22 of the separated water introduction line $L_{22}$, a pH after the addition of alkali can be obtained by calculation in a case where a property of the alkali is clear, and the addition of the alkaline agent can be adjusted to set a pH to be a predetermined pH. Furthermore, both of the first pH meter 23A and the second pH meter 23B may be installed, and whether a change in pH by the alkaline agent that has been adjusted and fed by calculation based on the first pH meter 23A results in a predetermined pH may be checked by the second pH meter 23B.

Strong alkaline agents such as sodium hydroxide (NaOH), calcium hydroxide (Ca(OH)$_2$), and calcium oxide (CaO), and weak alkaline agents such as calcium carbonate (CaCO$_3$) may be exemplified as the alkaline agent 21. However, the alkaline agent 21 is not limited thereto as long as it is a chemical that exhibits the removal performance of the acid gas.

By measuring a pH in the desulfurization waste water 15 or the separated water 18 introduced into the spray drying device 19 and adding the alkaline agent 21 to satisfy a predetermined pH (pH 6 to 10), the acid gas can be removed while excess and deficiency of the removal performance of the acid gas can be prevented. As a result, the volatilization of the acid gas can be suppressed with minimal alkali cost, and the accumulation of components due to an acid gas such as chlorine ions in the desulfurization device 14 system can be prevented.

EXAMPLE 2

Figure 4:
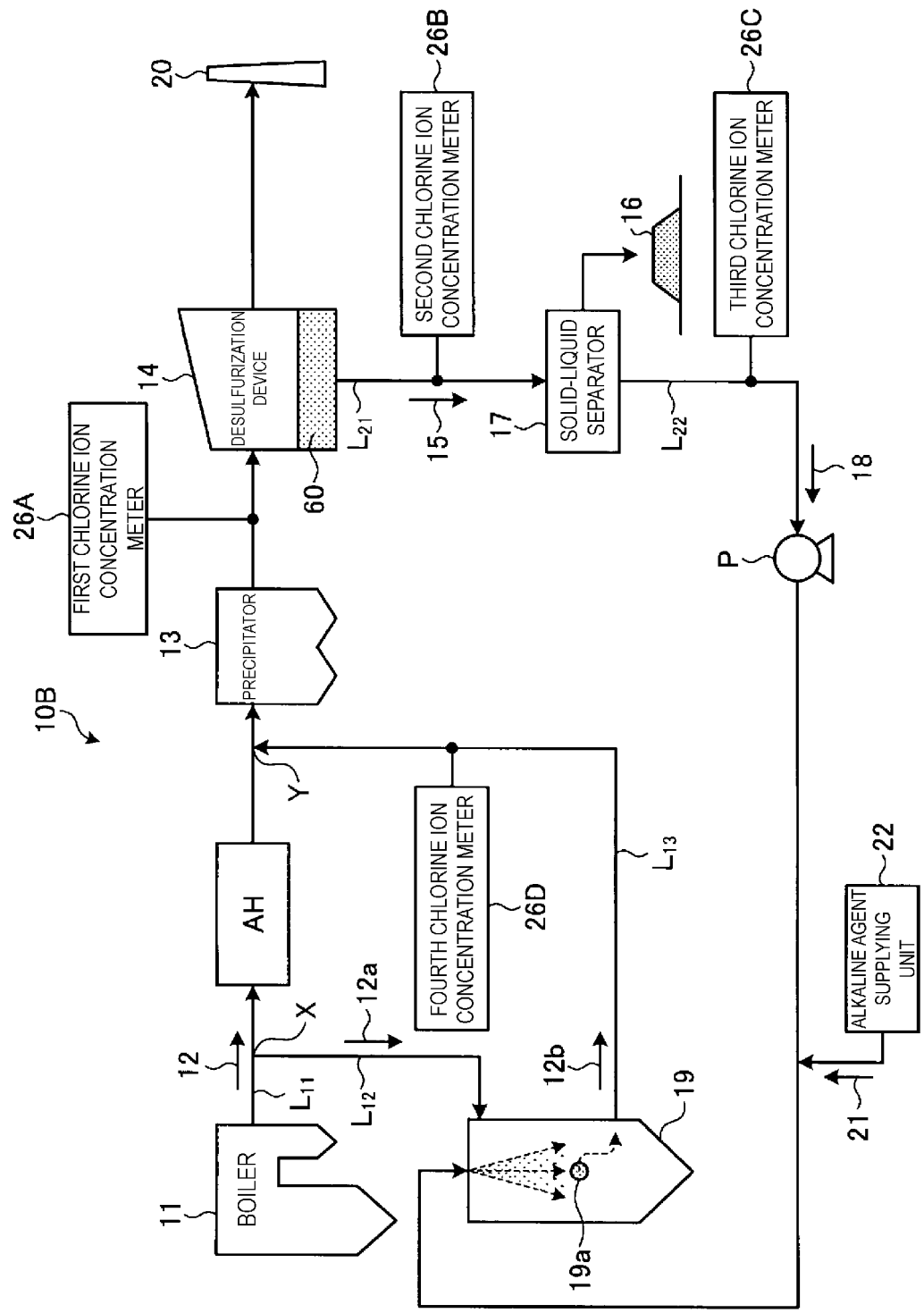
FIG. 4 is a schematic view of a non-waste water flue gas treatment system of Example 2.

FIG. 4 is a schematic view of a non-waste water flue gas treatment system of Example 2. Note that members that are the same as those of the non-waste water flue gas treatment system of Example 1 are given the same reference numerals, and description thereof is omitted. Further, although the present invention is unconcerned about the presence of absence of a solid-liquid separator, description will be given of an aspect including the solid-liquid separator herein. Note that when the solid-liquid separator is not installed, the separated water 18 is replaced with the desulfurization waste water 15. As illustrated in FIG. 4, in a non-waste water flue gas treatment system 10B according to the present embodiment, first to fourth chlorine ion concentration meters 26A to 26D are each installed in the main flue $L_{11}$, the flue gas supplying line $L_{13}$, the desulfurization waste water line $L_{21}$, and the separated water introduction line $L_{22}$ in the non-waste water flue gas treatment system 10A-1 according to Example 1. In the present embodiment, the first chlorine ion concentration meter 26A is installed between the precipitator 13 and the desulfurization device 14 of the main flue $L_{11}$, and measures a chlorine ion concentration in the boiler flue gas 12. Further, the second chlorine ion concentration meter 26B is installed between the desulfurization device 14 and the solid-liquid separator 17 of the desulfurization waste water line $L_{21}$, and measures a chlorine ion concentration in the desulfurization waste water 15. The third chlorine ion concentration meter 26C is installed between the solid-liquid separator 17 and the alkaline agent supplying unit 22 of the separated water introduction line $L_{22}$, and measures a chlorine ion concentration in the separated water 18. The fourth chlorine ion concentration meter 26D is installed in the flue gas supplying line $L_{13}$ in which the flue gas 12b from the spray drying device 19 is discharged, and measures a chlorine ion concentration in the flue gas 12b.

Any one of the chlorine ion concentration meters may be installed, but a plurality of the chlorine ion concentration meters may be installed to improve the accuracy of the measurement. Here, examples of a device configured to measure a chlorine ion concentration include an online IR meter, an ion chromatogram, a laser measuring meter, and the like, but the present invention is not limited to this as long as the device measures a chlorine ion concentration.

According to the present embodiment, a chlorine ion concentration in the gas and the liquid is obtained from an analysis result of any of or the plurality of the first to fourth chlorine ion concentration meters 26A to 26D, and the alkaline agent supplying unit 22 adds the alkaline agent 21 to cause a ratio of the chlorine ion (Cl$^-$ ion) to the alkaline agent in the separated water 18, namely, a molar ratio of alkaline agent and chlorine (Cl) ion to fall within a predetermined range.

In other words, based on the measured chlorine ion concentration, the amount of addition of the alkaline agent which may cause the molar ratio of alkaline agent and chlorine (Cl) ion to fall within a predetermined range is obtained by a computation device. The alkaline agent supplying unit 22 supplies the alkaline agent 21 in the amount of addition of the alkaline agent 21 obtained by this computation device according to an instruction of a control device or a determination of an operator.

Figure 11:
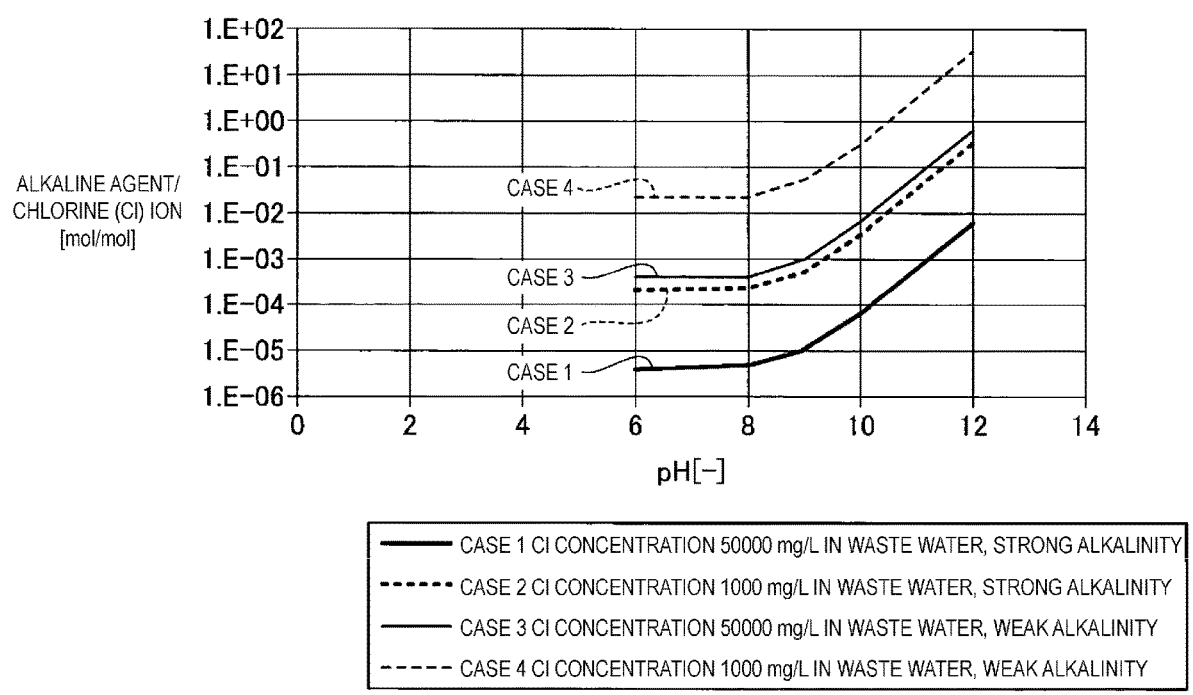
FIG. 11 is a graph illustrating a correlation between a molar ratio of alkaline agent and chlorine (Cl) ion and a pH.

Here, the molar ratio of alkaline agent and chlorine (Cl) ion will be described with reference to FIG. 11. FIG. 11 is a graph illustrating a correlation between a molar ratio of alkaline agent and chlorine (Cl) ion and a pH. In FIG. 11, the vertical axis indicates "alkaline agent (volume molar concentration (mol/L))/chlorine ion (volume molar concentration (mol/L))". The description of the vertical axis is simplified and referred to as a molar ratio of alkaline agent and chlorine (Cl) ion. The chlorine ion concentration in waste water used in a measurement test in FIG. 11 was 50000 mg/L (1451 mmol/L) and 1000 mg/L (29 mmol/L).

This test example indicates the maximum and minimum behavior when a weak alkaline substance (calcium carbonate) is added as the alkaline agent and the maximum and minimum when a strong alkaline substance (sodium hydroxide) is added. Case 1 has a chlorine (Cl) ion concentration of 50000 mg/L (1451 mmol/L) in waste water, which is strongly alkaline. Case 2 has a chlorine (Cl) ion concentration of 1000 mg/L (29 mmol/L) in waste water, which is strongly alkaline. Case 3 has a chlorine (Cl) ion concentration of 50000 mg/L (1451 mmol/L) in waste water, which is weakly alkaline. Case 4 has a chlorine (Cl) ion concentration of 1000 mg/L (29 mmol/L) in waste water, which is weakly alkaline.

As shown in FIG. 11, when a pH value of the horizontal axis ranges from pH=6 to 10, a molar ratio of alkaline agent and chlorine (Cl) ion ranges from 0.000004 to 0.35. Thus, a predetermined range of the molar ratio of alkaline agent and chlorine (Cl) ion is a range in which a ratio of "alkali (volume molar concentration)/chlorine ion (volume molar concentration)" is 0.000004 to 0.35. Note that this correlation changes depending on Cl concentration (mg/L), alkaline concentration (strong alkalinity, weak alkalinity), and the like in waste water, but a pH value can be adjusted in a predetermined range as long as the ratio of "alkaline agent (volume molar concentration)/chlorine ion (volume molar concentration)" is in a range of 0.000004 to 0.35. Further, the molar ratio of alkaline agent and chlorine (Cl) ion may be adjusted to cause a pH value of the horizontal axis falls within a range of pH=7 to 8.

Note that, in addition to a Cl concentration (mg/L) in waste water and a degree of dissociation of alkali (strong alkalinity, weak alkalinity), an ionic strength, a solid concentration, and the like of a spray liquid, for example, serve as a factor that causes fluctuations in the molar ratio of alkaline agent and chlorine (Cl) ion. Particularly, the Cl concentration (mg/L) and the like in waste water are dominant.

Figure 12:
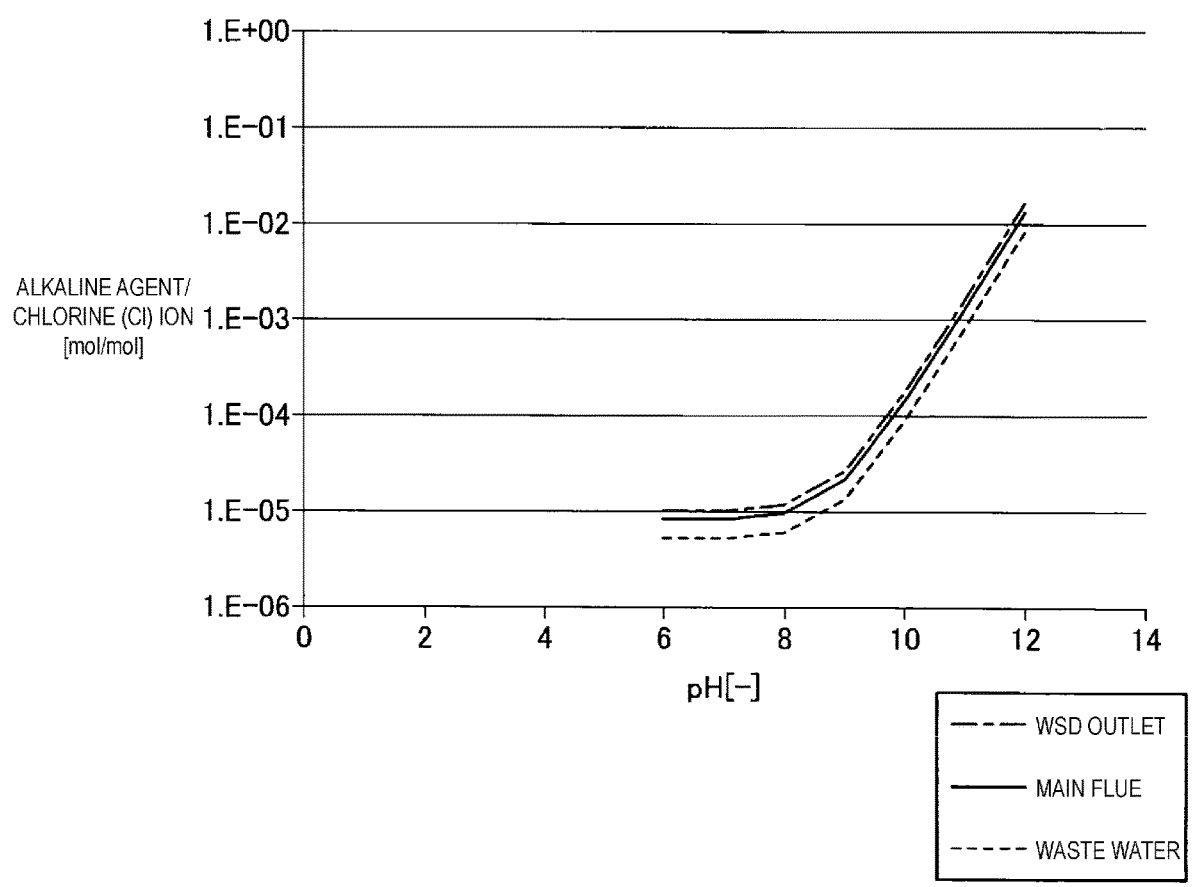
FIG. 12 is a graph illustrating a correlation between a molar ratio of alkaline agent and chlorine (Cl) ion and a pH.

Further, FIG. 12 is a graph illustrating a correlation between a molar ratio of alkaline agent and chlorine (Cl) ion and a pH in waste water, the outlet of the spray drying device, and the main flue. A chlorine ion concentration in waste water used in a test in FIG. 12 is 40000 mg/L (1161 mmol/L), and a strong alkaline substance is added as an alkaline agent. As shown in FIG. 12, it turned out that behavior indicating the correlation between the molar ratio of alkaline agent and chlorine (Cl) ion and the pH in the outlet of the spray drying device and the main flue closely resembles behavior of the waste water.

According to the present embodiment, the alkaline agent 21 is added in accordance with a chlorine ion concentration in the gas (the boiler flue gas 12 and the flue gas 12b) and in the liquid (the desulfurization waste water 15 and the separated water 18) to cause the molar ratio of alkaline agent and chlorine (Cl) ion to fall within a predetermined range in which a sufficient neutralization reaction occurs. Thus, the amount of addition of the alkaline agent 21 can be optimized, and excess and deficiency of the removal performance of the acid gas can be prevented.

EXAMPLE 3

Figure 5:
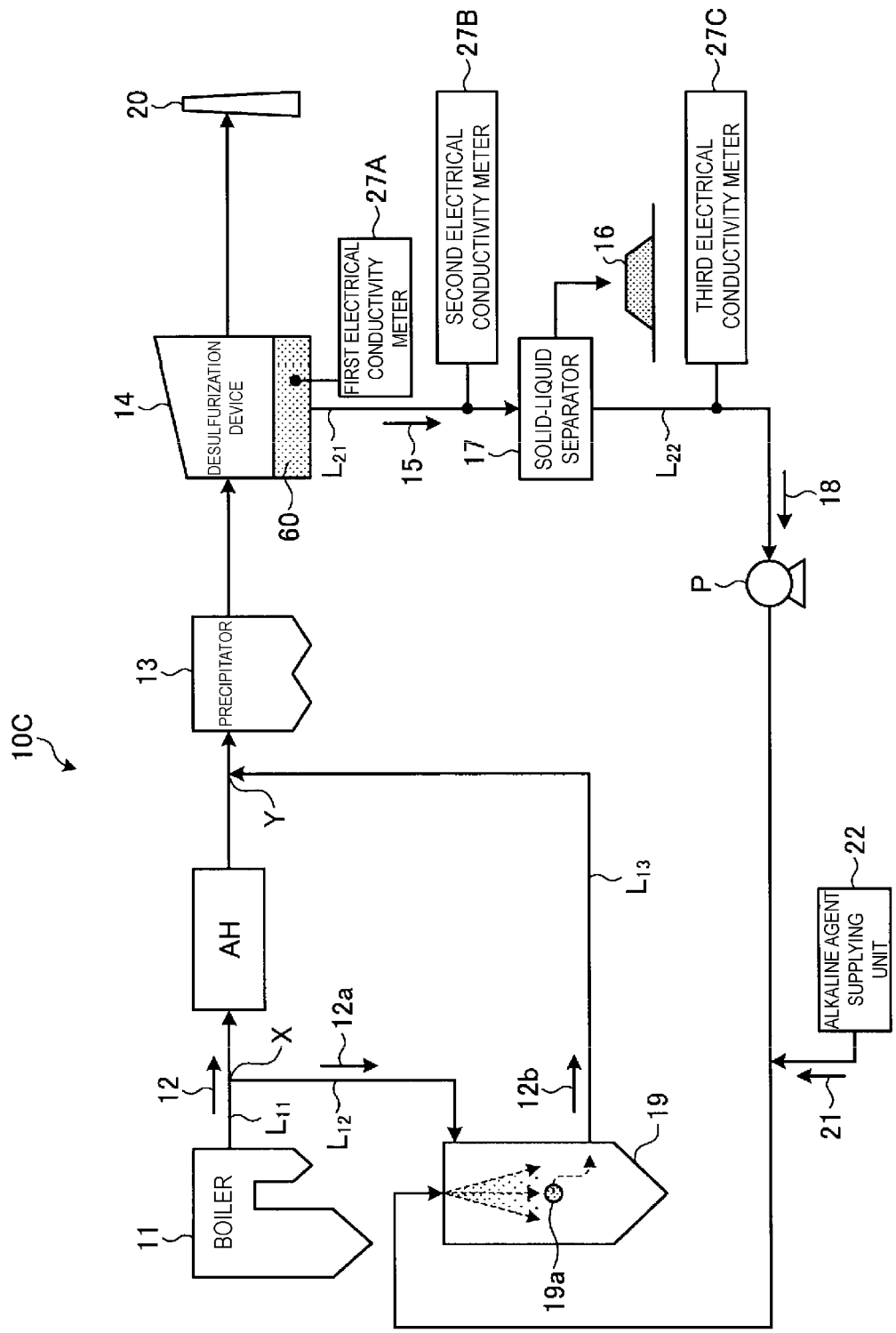
FIG. 5 is a schematic view of a non-waste water flue gas treatment system of Example 3.

FIG. 5 is a schematic view of a non-waste water flue gas treatment system of Example 3. Note that members that are the same as those of the non-waste water flue gas treatment systems of Examples 1 and 2 are given the same reference numerals, and description thereof is omitted. As illustrated in FIG. 5, in a non-waste water flue gas treatment system 10C according to the present embodiment, first to third electrical conductivity meters 27A to 27C configured to measure electrical conductivity in liquid are installed in the desulfurization device 14, the desulfurization waste water line $L_{21}$, and the separated water introduction line $L_{22}$ in the non-waste water flue gas treatment system 10A-1 according to Example 1. Any one of the electrical conductivity meters may be installed, but a plurality of the electrical conductivity meters may be installed to improve the accuracy of the measurement.

According to the present embodiment, a chlorine ion concentration in the desulfurization waste water 15 or the separated water 18 is obtained from a relationship between previously obtained electrical conductivity and a chlorine ion in the desulfurization waste water 15 or the separated water 18, and the alkaline agent supplying unit 22 adds the alkaline agent 21 to cause a ratio of the chlorine ion (Cl⁻ ion) to the alkaline agent in the separated water 18, namely, a molar ratio of alkaline agent and chlorine (Cl) ion to fall within a predetermined range.

According to the present embodiment, the alkaline agent 21 is added in accordance with a chlorine ion concentration in the desulfurization waste water 15 or the separated water 18 to cause the molar ratio of alkaline agent and chlorine (Cl) ion to fall within a predetermined range (0.000001 to 1.0) in which a sufficient neutralization reaction occurs. Thus, the amount of addition of the alkaline agent 21 can be optimized, and excess and deficiency of the removal performance of the acid gas can be prevented.

EXAMPLE 4

Figure 6:
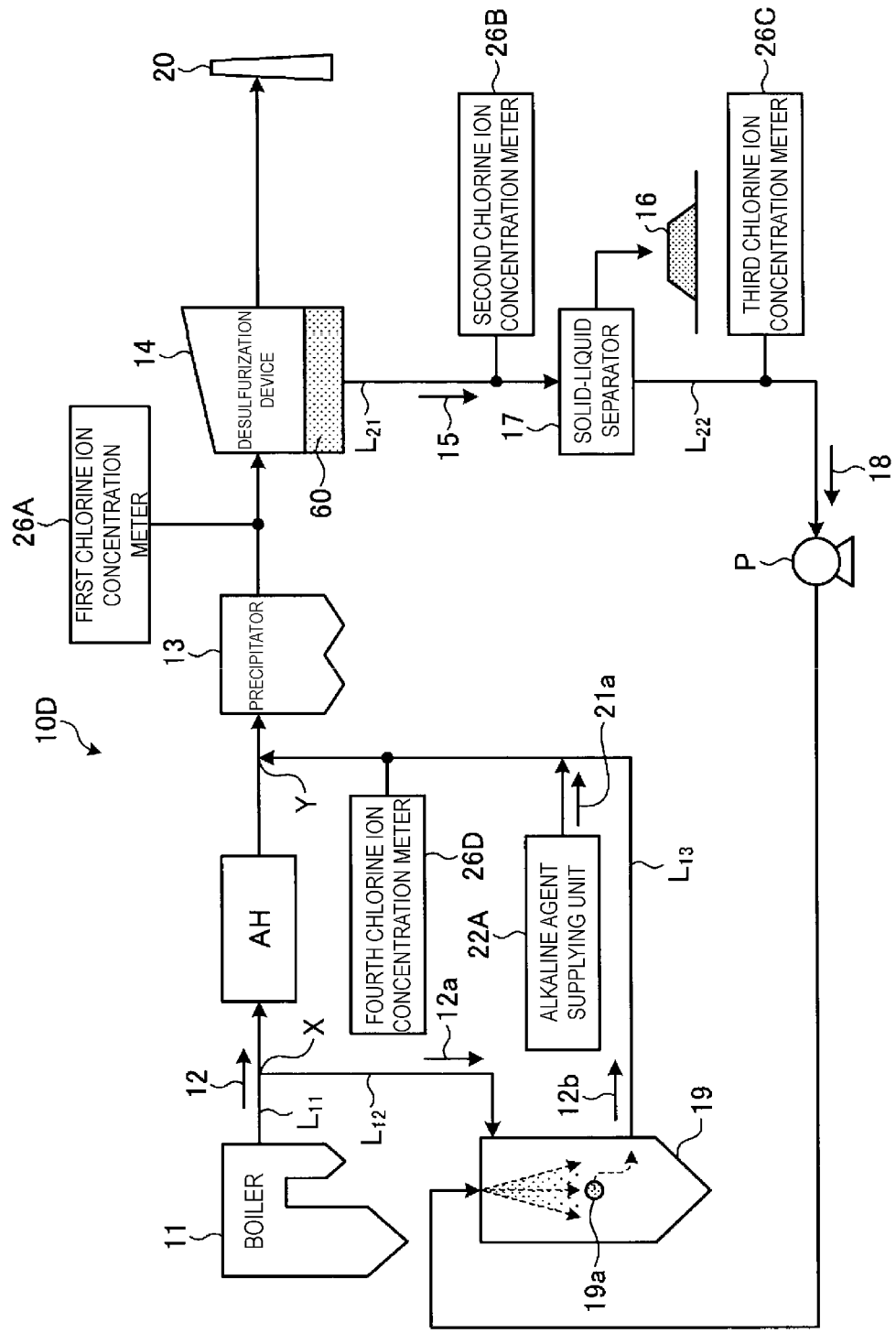
FIG. 6 is a schematic view of a non-waste water flue gas treatment system of Example 4.

FIG. 6 is a schematic view of a non-waste water flue gas treatment system of Example 4. Note that members that are the same as those of the non-waste water flue gas treatment systems of Examples 1 to 3 are given the same reference numerals, and description thereof is omitted. As illustrated in FIG. 6, in a non-waste water flue gas treatment system 10D according to the present embodiment, first to fourth chlorine ion concentration meters 26A to 26D are installed in the main flue $L_{11}$, the flue gas supplying line $L_{13}$, the desulfurization waste water line $L_{21}$, and the separated water introduction line $L_{22}$ in the non-waste water flue gas treatment system 10A-1 according to Example 1. Further, in the present embodiment, an alkaline agent powder supplying unit 22A or the alkaline agent supplying unit 22 that supplies alkaline agent powder 21a in powder form or the alkaline agent 21 in liquid form is installed in the flue gas supplying line $L_{13}$. Any one of the chlorine ion concentration meters may be installed, but a plurality of the chlorine ion concentration meters may be installed to improve the accuracy of the measurement.

According to the present embodiment, a chlorine ion concentration in the gas (the boiler flue gas 12 and the flue gas 12b) and the liquid (desulfurization waste water 15 and the separated water 18) is obtained from an analysis result of any of or the plurality of the first to fourth chlorine ion concentration meters 26A to 26D, and the alkaline agent supplying unit 22 adds the alkaline agent 21 to cause a molar ratio of alkaline agent and chlorine (Cl) ion, which is a ratio of the chlorine ion (Cl⁻ ion) to the alkaline agent in the separated water 18, to fall within a predetermined range.

According to the present embodiment, the alkaline agent powder 21a in powder form or the alkaline agent 21 in liquid form is added in accordance with a chlorine ion concentration in the gas (the boiler flue gas 12 and the flue gas 12b) and in the liquid (the desulfurization waste water 15 and the separated water 18) to cause the molar ratio of alkaline agent and chlorine (Cl) ion to fall within a predetermined range (0.000004 to 0.35) in which a sufficient neutralization reaction occurs. Thus, the amount of addition of the alkaline agent can be optimized, and excess and deficiency of the removal performance of the acid gas can be prevented.

EXAMPLE 5

Figure 7:
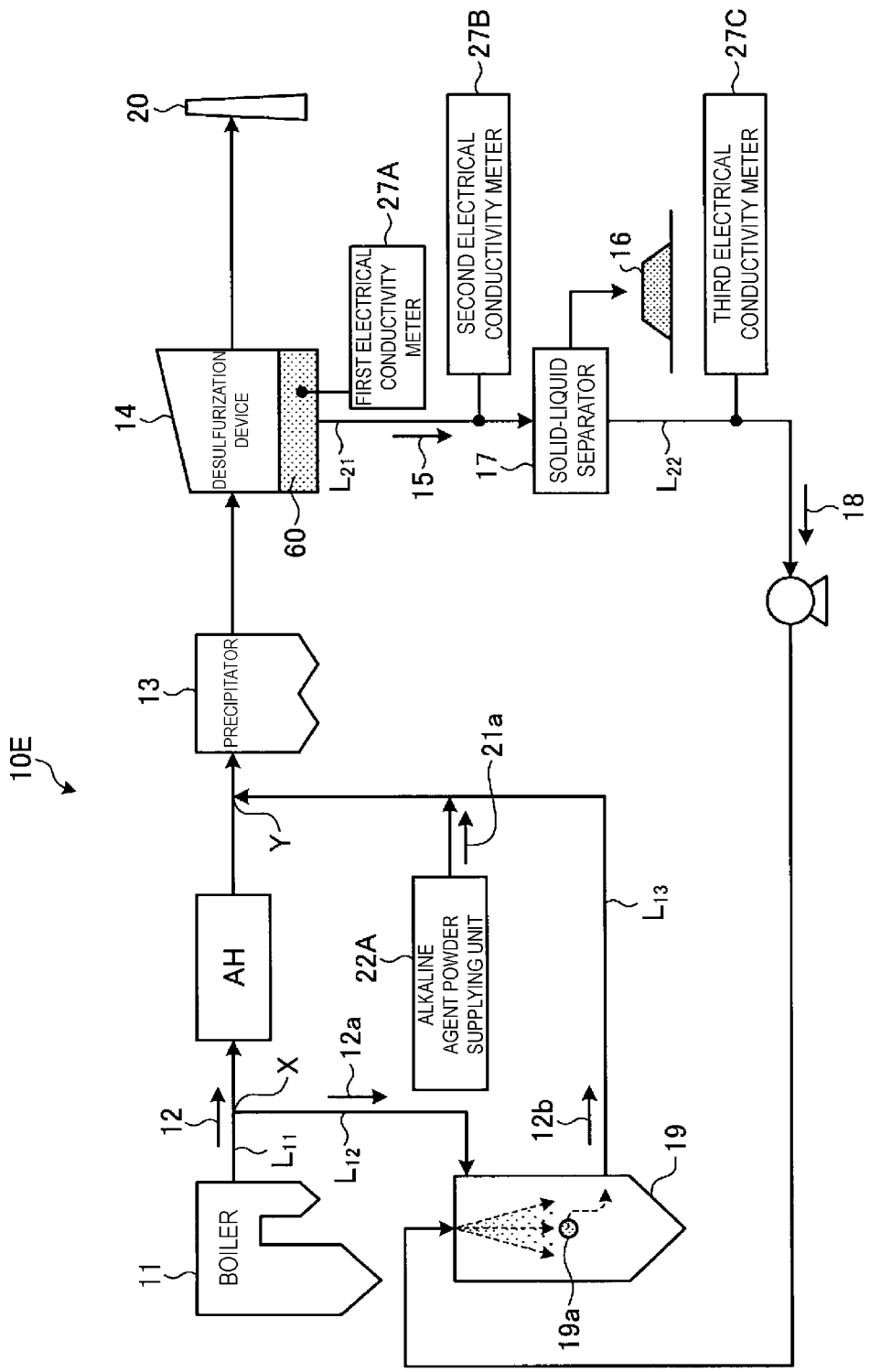
FIG. 7 is a schematic view of a non-waste water flue gas treatment system of Example 5.

FIG. 7 is a schematic view of a non-waste water flue gas treatment system of Example 5. Note that members that are the same as those of the non-waste water flue gas treatment systems of Examples 1 to 4 are given the same reference numerals, and description thereof is omitted. As illustrated in FIG. 7, in a non-waste water flue gas treatment system 10E according to the present embodiment, first to third electrical conductivity meters 27A to 27C configured to measure electrical conductivity in liquid are installed in the desulfurization device 14, the desulfurization waste water line $L_{21}$, and the separated water introduction line $L_{22}$ in the non-waste water flue gas treatment system 10A-1 according to Example 1. Further, in the present embodiment, the alkaline agent powder supplying unit 22A or the alkaline agent supplying unit 22 that supplies the alkaline agent powder 21a in powder form or the alkaline agent 21 in liquid form is installed in the flue gas supplying line $L_{13}$. Any one of the electrical conductivity meters may be installed, but a plurality of the electrical conductivity meters may be installed to improve the accuracy of the measurement.

According to the present embodiment, a chlorine ion concentration in the desulfurization waste water 15 or the separated water 18 is obtained from a relationship between previously obtained electrical conductivity and a chlorine ion in the absorbing liquid 60, the desulfurization waste water 15, or the separated water 18, and the alkaline agent supplying unit 22 adds the alkaline agent 21 to cause a ratio of the chlorine ion (Cl⁻ ion) to the alkaline agent in the separated water 18, namely, a molar ratio of alkaline agent and chlorine (Cl) ion to fall within a predetermined range.

According to the present embodiment, the alkaline agent in powder form or liquid form is added in accordance with a chlorine ion concentration in the absorbing liquid 60, the desulfurization waste water 15, or the separated water 18 to cause the molar ratio of alkaline agent and chlorine (Cl) ion to fall within a predetermined range (0.000004 to 0.35) in which a sufficient neutralization reaction occurs. Thus, the amount of addition of the alkaline agent 21 can be optimized, and excess and deficiency of the removal performance of the acid gas can be prevented.

EXAMPLE 6

Figure 8:
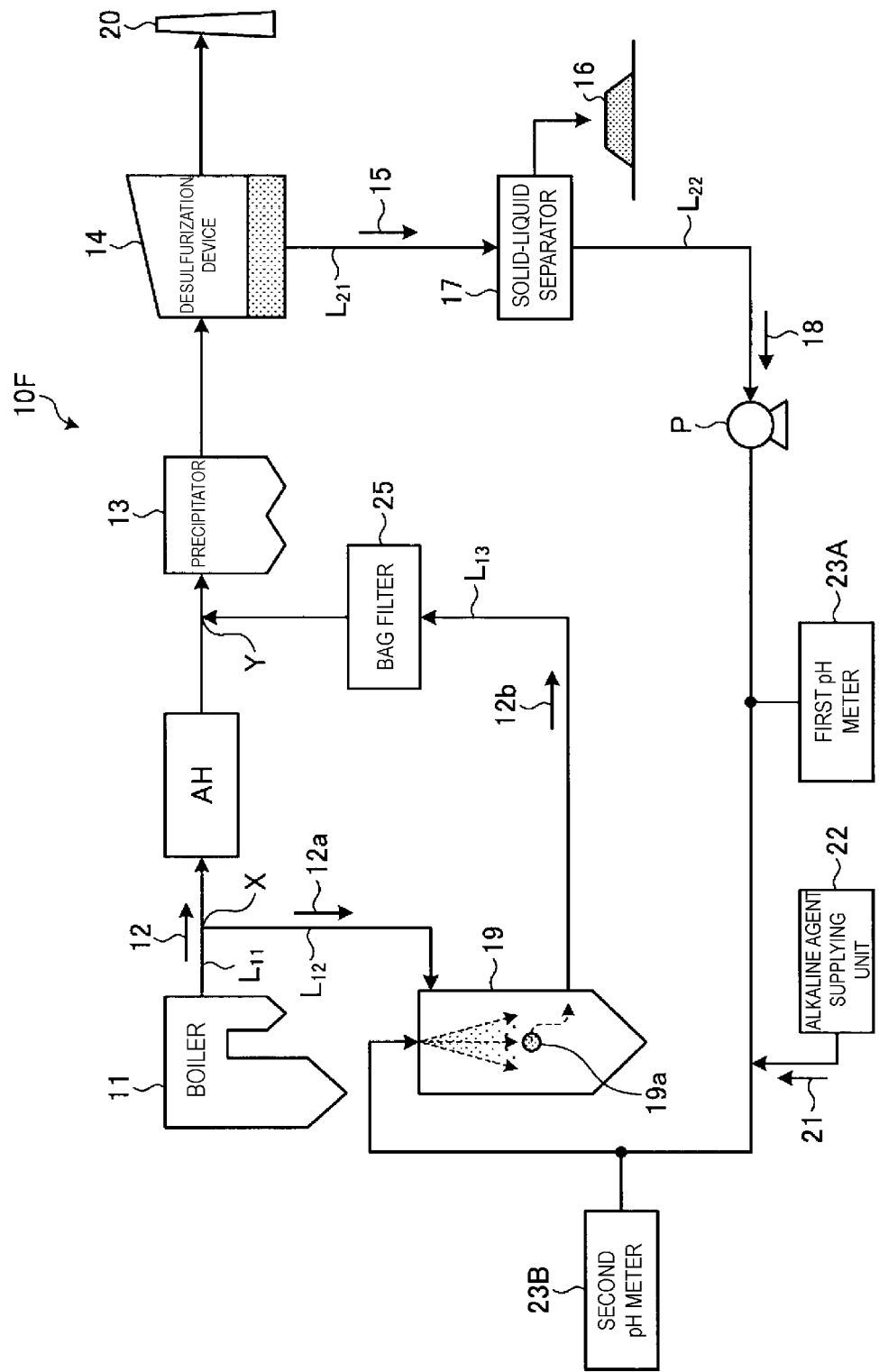
FIG. 8 is a schematic view of a non-waste water flue gas treatment system of Example 6.

FIG. 8 is a schematic view of a non-waste water flue gas treatment system of Example 6. As illustrated in FIG. 8, a non-waste water flue gas treatment system 10F according to the present embodiment is provided with, for example, a bag filter 25 as a solid removal device configured to remove a solid in the flue gas 12b in the flue gas supply line $L_{13}$ in the non-waste water flue gas treatment system 10A-1. The present embodiment can be similarly applied to the non-waste water flue gas treatment systems 10B to 10E. In Example 1, the solid (such as evaporation salt) 19a in the flue gas discharged from the spray drying device 19 is collected by the precipitator 13 and mixed with collected ashes of the precipitator 13 and discharged. In this case, the solid (such as evaporation salt) is mixed with ashes, and thus the content of harmful metals and the like may be increased, and it may be difficult to sell the ashes.

According to the present embodiment, the solid in the flue gas 12b is removed by installing the bag filter 25, and the solid (such as evaporation salt) 19a in the flue gas 12b discharged from the spray drying device 19 can be prevented from mixing with ashes collected by the precipitator 13.

EXAMPLE 7

Figure 9:
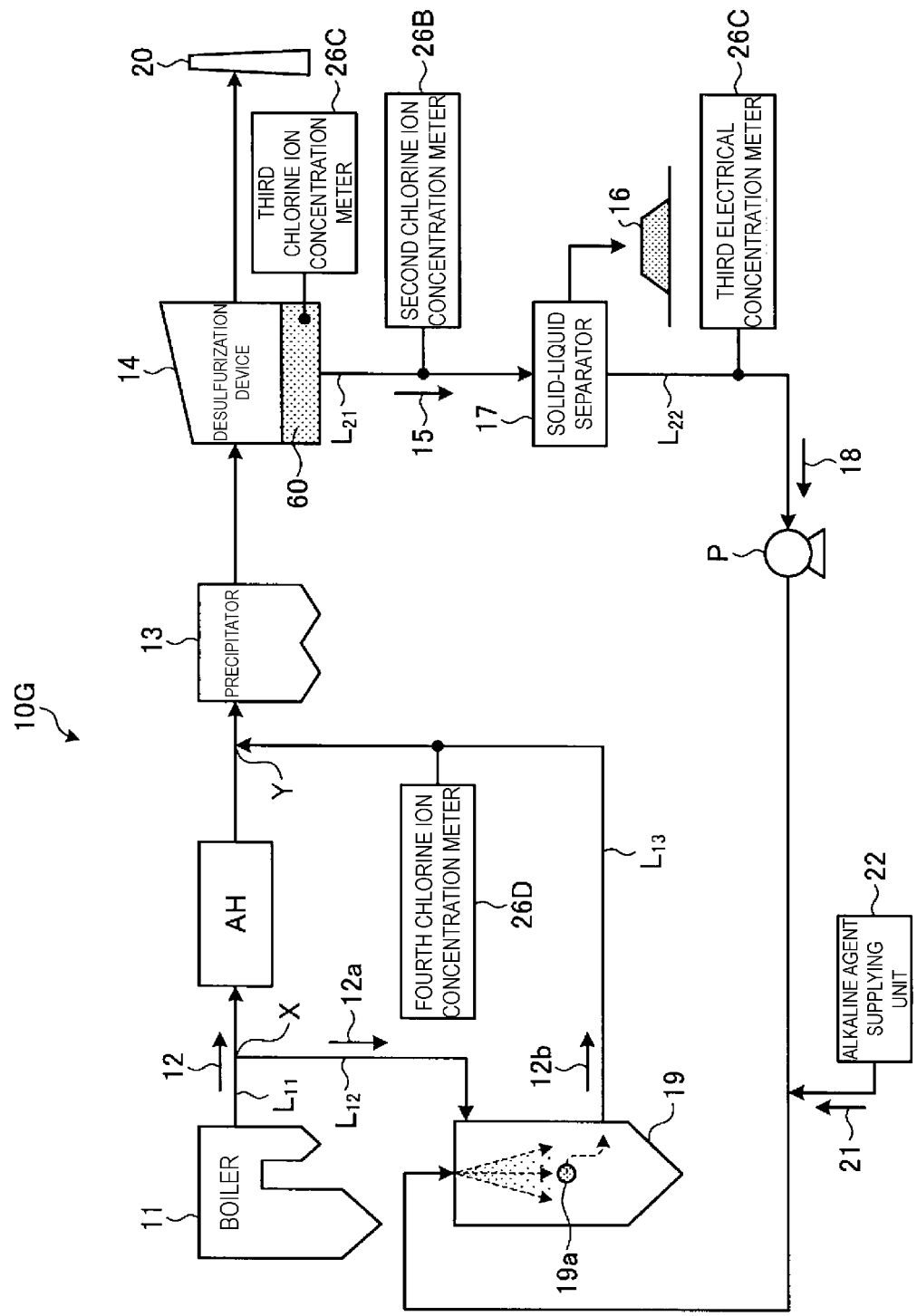
FIG. 9 is a schematic view of a non-waste water flue gas treatment system of Example 7.

FIG. 9 is a schematic view of a non-waste water flue gas treatment system of Example 7. Note that members that are the same as those of the non-waste water flue gas treatment systems of Examples 1 to 5 are given the same reference numerals, and description thereof is omitted. As illustrated in FIG. 9, in a non-waste water flue gas treatment system 10G according to the present embodiment, the second chlorine ion concentration meter 26B and the third chlorine ion concentration meter 26C are respectively installed in the desulfurization waste water line $L_{21}$ and the separated water introduction line $L_{22}$ in the non-waste water flue gas treatment system 10D according to Example 4.

The present embodiment indicates a case where a chlorine ion in the liquid of the desulfurization waste water 15 or the separated water 18 is measured directly. According to the present embodiment, a chlorine ion concentration in the separated water 18 is obtained from an analysis result of any of or the plurality of the second and third chlorine ion concentration meters 26B and 26C, and the alkaline agent supplying unit 22 adds the alkaline agent 21 to cause a ratio of the chlorine ion (Cl⁻ ion) to the alkaline agent in the desulfurization waste water 15 or the separated water 18, namely, a molar ratio of alkaline agent and chlorine (Cl) ion to fall within a predetermined range (0.000001 to 0.1).

According to the present embodiment, a chlorine ion in the desulfurization waste water 15 or the separated water 18 is measured directly, and the alkaline agent 21 is added in accordance with the chlorine ion concentration in the separated water 18 to cause the molar ratio of alkaline agent and chlorine (Cl) ion to fall within a predetermined range (0.000004 to 3.5) in which a sufficient neutralization reaction occurs. Thus, the amount of addition of the alkaline agent 21 can be optimized, and excess and deficiency of the removal performance of the acid gas can be prevented.

EXAMPLE 8

Figure 10:
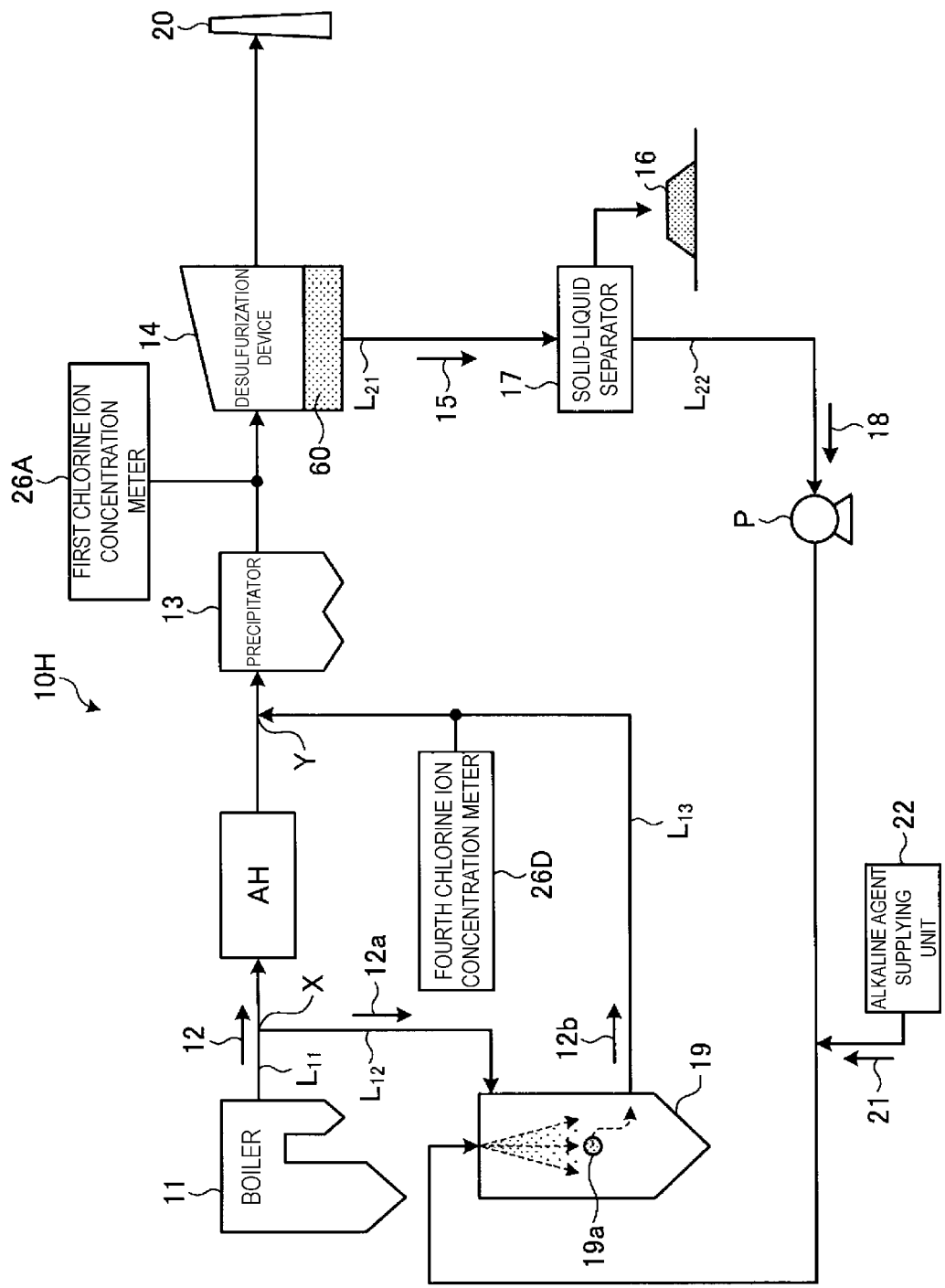
FIG. 10 is a schematic view of a non-waste water flue gas treatment system of Example 8.

FIG. 10 is a schematic view of a non-waste water flue gas treatment system of Example 8. Note that members that are the same as those of the non-waste water flue gas treatment systems of Examples 1 to 5 are given the same reference numerals, and description thereof is omitted. As illustrated in FIG. 10, in a non-waste water flue gas treatment system 10H according to the present embodiment, the first chlorine ion concentration meter 26A and the fourth chlorine ion concentration meter 26D are respectively installed in the main flue $L_{11}$ and the flue gas supplying line $L_{13}$ in the non-waste water flue gas treatment system 10D according to Example 4.

In a plant of actual equipment, the molar ratio of the alkaline agent and chlorine (Cl) ion varies between the gas and the liquid, and also varies between the boiler flue gas 12 and the flue gas 12b in the gas. Further, a width of fluctuations varies depending on operating conditions. Thus, a chlorine ion concentration in the gas (the boiler flue gas 12 and the flue gas 12b) is measured with a chlorine ion concentration meter, and the chlorine ion concentration is converted to a chlorine ion concentration in the liquid once without being based on the measurement value, and the alkaline agent 21 is added from the alkaline agent supplying unit 22 based on the converted chlorine ion concentration in the liquid to cause the molar ratio of alkaline agent and chlorine (Cl) ion to fall within a predetermined range. As a result, two predetermined ranges between the gas and the liquid do not need to be determined in one plant, and control by the actual equipment is simplified. Note that FIG. 12 described above also indicates that the behavior indicating the correlation between the ratio of alkaline agent and chlorine (Cl) ion and the pH closely resembles the behavior of the waste water.

In other words, in the plant of the actual equipment, the molar ratio of alkaline agent and chlorine (Cl) ion is determined only for the liquid (the desulfurization waste water 15 or the separated water 18), and it is not necessary to determine the molar ratio in the boiler flue gas 12 and the flue gas 12b. Note that this conversion can be obtained by flow rates of various gases and a flow rate of desulfurization waste water.

According to the present embodiment, a chlorine ion concentration in the gas (the boiler flue gas 12 and the flue gas 12b) is converted to a chlorine ion concentration in the liquid (the desulfurization waste water 15 and the separated water 18), and the alkaline agent in powder form or liquid form is added in accordance with the chlorine ion concentration in the liquid to cause the molar ratio of alkaline agent and chlorine (Cl) ion to fall within a predetermined range (0.000004 to 0.35) in which a sufficient neutralization reaction occurs. Thus, the amount of addition of the alkaline agent can be optimized, and excess and deficiency of the removal performance of the acid gas can be prevented.

REFERENCE SIGNS LIST

10A-1, 10A-2, 10B to 10H Non-waste water flue gas treatment system 11 Boiler
12 Boiler flue gas
13 Precipitator
14 Desulfurization device
15 Desulfurization waste water
16 Solid
17 Solid-liquid separator
18 Separated water
19 Spray drying device
21 Alkaline agent
21a Alkaline agent powder
22 Alkaline agent supplying unit
22A Alkaline agent powder supplying unit
23A to 23B First to second pH meters
25 Bag filter
26A to 26D First to fourth chlorine ion concentration meters
27A to 27C First to third electrical conductivity meters
$L_{11}$ Main flue
$L_{21}$ Desulfurization waste water line
$L_{22}$ Separated water introduction line

The invention claimed is:

1. A non-waste water flue gas treatment system, comprising:
   a boiler configured to combust fuel;
   a heat recovering device provided in a main flue that discharges a boiler flue gas from the boiler and configured to recover heat of the boiler flue gas;
   a desulfurization device configured to remove a sulfur oxide contained in the boiler flue gas with a desulfurization absorbing liquid;
   a spray drying device configured to spray waste water including desulfurization waste water discharged from the desulfurization device;
   a flue gas introduction line configured to introduce a drying gas for evaporating and drying the desulfurization waste water into the spray drying device;
   a flue gas supplying line configured to return a flue gas obtained after the desulfurization waste water being evaporated and dried in the spray drying device back to the main flue;
   an alkali supplying unit configured to add an alkaline agent to a desulfurization waste water line that connects the desulfurization device and the spray drying device; and
   a pH meter configured to measure a pH in the desulfurization waste water in the desulfurization waste water line before and after the alkali supplying unit, wherein
   the alkali supplying unit adds the alkaline agent in accordance with a measurement result of a measured pH to cause a pH value of desulfurization waste water after addition of the alkaline agent to fall within pH 6 to 10.

2. The non-waste water flue gas treatment system according to claim 1, further comprising:
   a solid-liquid separator provided in the desulfurization waste water line that discharges the desulfurization waste water and configured to separate a solid; and
   a separated water introduction line configured to supply separated water from the solid-liquid separator to the spray drying device, wherein
   the alkali supplying unit is provided in the separated water introduction line between the solid-liquid separator and the spray drying device,
   the pH meter is provided in the separated water introduction line at least upstream or downstream of the alkali supplying unit, and
   the alkali supplying unit adds the alkaline agent in accordance with a measurement result of a measured pH to cause a pH value of separated water after addition of the alkaline agent to fall within pH 6 to 10.

3. The non-waste water flue gas treatment system according to claim 1, wherein
   a solid removal device configured to remove a solid in flue gas is provided in the flue gas supplying line.

4. A non-waste water flue gas treatment system, comprising:
   a boiler configured to combust fuel;
   a heat recovering device provided in a main flue that discharges a boiler flue gas from the boiler and configured to recover heat of the boiler flue gas;
   a desulfurization device configured to remove a sulfur oxide contained in the boiler flue gas with a desulfurization absorbing liquid;
   a spray drying device configured to spray waste water including desulfurization waste water discharged from the desulfurization device;
   a flue gas introduction line configured to introduce a drying gas for evaporating and drying the waste water into the spray drying device;
   a flue gas supplying line configured to return a flue gas after the waste water being evaporated and dried in the spray drying device back to the main flue;
   an alkali supplying unit configured to add an alkaline agent to a desulfurization waste water line that connects the desulfurization device and the spray drying device, or to the flue gas supplying line; and
   a chlorine ion measurement device provided in any one of or a plurality of the main flue, the flue gas supplying line and the desulfurization waste water line and configured to measure a concentration of a chlorine ion, wherein
   the alkali supplying unit adds the alkaline agent to the desulfurization waste water or the flue gas in accordance with a result of a measured chlorine ion concentration to cause a molar ratio of alkaline agent and chlorine (Cl) ion to fall within a predetermined range.

5. The non-waste water flue gas treatment system according to claim 4, further comprising:
   a solid-liquid separator provided in the desulfurization waste water line that discharges the desulfurization waste water and configured to separate a solid; and
   a separated water introduction line configured to supply separated water from the solid-liquid separator to the spray drying device, wherein
   the chlorine ion measurement device and the alkali supplying unit are provided in the separated water introduction line between the solid-liquid separator and the spray drying device, and
   the alkali supplying unit adds the alkaline agent to the separated water in accordance with a result of a measured chlorine ion concentration to cause a molar ratio of alkaline agent and chlorine (Cl) ion to fall within a predetermined range.

6. The non-waste water flue gas treatment system according to claim 4, wherein
   the alkaline agent added to the flue gas supplying line is liquid or powder.

7. A non-waste water flue gas treatment system, comprising:
   a boiler configured to combust fuel;
   a heat recovering device provided in a main flue that discharges a boiler flue gas from the boiler and configured to recover heat of the boiler flue gas;

a desulfurization device configured to remove a sulfur oxide contained in the boiler flue gas with a desulfurization absorbing liquid;

a spray drying device configured to spray waste water including desulfurization waste water from the desulfurization device;

a flue gas introduction line configured to introduce a drying gas for evaporating and drying the desulfurization waste water into the spray drying device;

a flue gas supplying line configured to return a flue gas obtained after the desulfurization waste water being evaporated and dried in the spray drying device back to the main flue;

an alkali supplying unit configured to add an alkaline agent to a desulfurization waste water line that connects the desulfurization device and the spray drying device, or to the flue gas supplying line; and an electrical conductivity meter provided in any one of or both of the desulfurization device and the desulfurization waste water line and configured to measure electrical conductivity in liquid, wherein the alkali supplying unit adds the alkaline agent to the desulfurization waste water or the flue gas in accordance with a result obtained by obtaining a chlorine ion concentration in liquid from a relationship between previously obtained electrical conductivity and a chlorine ion to cause a molar ratio of alkaline agent and chlorine (Cl) ion to fall within a predetermined range.

8. The non-waste water flue gas treatment system according to claim 7, further comprising:

a solid-liquid separator provided in the desulfurization waste water line that discharges the desulfurization waste water and configured to separate a solid; and a separated water introduction line configured to supply separated water from the solid-liquid separator to the spray drying device, wherein the electrical conductivity meter and the alkali supplying unit are provided in the separated water introduction line, and the alkali supplying unit adds the alkaline agent to separated water in accordance with a result obtained by obtaining a chlorine ion concentration in the separated water from a relationship between previously obtained electrical conductivity and a chlorine ion to cause a molar ratio of alkaline agent and chlorine (Cl) ion to fall within a predetermined range.

9. A non-waste water flue gas treatment method, comprising:

a desulfurization step of removing a sulfur oxide contained in a boiler flue gas with a desulfurization absorbing liquid;

a spray drying step of spraying waste water including desulfurization waste water discharged in the desulfurization step, and drying the waste water with a part of the boiler flue gas;

a pH measurement step of measuring a pH in the desulfurization waste water; and an alkali supplying step of adding an alkaline agent to the desulfurization waste water, wherein in the alkali supplying step, the alkaline agent is added in accordance with a measurement result of a measured pH to cause a pH value of desulfurization waste water after addition of the alkaline agent to fall within pH 6 to 10.

10. A non-waste water flue gas treatment method, comprising:

a desulfurization step of removing a sulfur oxide contained in a boiler flue gas with a desulfurization absorbing liquid;

a spray drying step of spraying waste water including desulfurization waste water discharged in the desulfurization step, and drying the waste water with a part of the boiler flue gas;

an alkali supplying step of adding an alkaline agent to the desulfurization waste water or a flue gas from the spray drying step; and a chlorine ion measurement step of measuring a concentration of a chlorine ion contained in any one of or a plurality of fluids of the boiler flue gas, a flue gas after the spray drying step, and the desulfurization waste water, wherein in the alkali supplying step, the alkaline agent is added to the desulfurization waste water or the flue gas in accordance with a result of a measured chlorine ion concentration to cause a molar ratio of alkaline agent and chlorine (Cl) ion to fall within a predetermined range.

11. A non-waste water flue gas treatment method, comprising:

a desulfurization step of removing a sulfur oxide contained in a boiler flue gas with a desulfurization absorbing liquid;

a spray drying step of spraying waste water including desulfurization waste water discharged in the desulfurization step, and drying the waste water with a part of the boiler flue gas;

an alkali supplying step of adding an alkaline agent to the desulfurization waste water or a flue gas from the spray drying step; and an electrical conductivity measurement step of measuring electrical conductivity in liquid of any one of or both of the desulfurization absorbing liquid and the desulfurization waste water, wherein in the alkali supplying step, the alkaline agent is added to the desulfurization waste water or the flue gas in accordance with a result obtained by obtaining a chlorine ion concentration in liquid from a relationship between previously obtained electrical conductivity and a chlorine ion to cause a molar ratio of alkaline agent and chlorine (Cl) ion to fall within a predetermined range.

* * * * *